「12」 United States Patent
Biernath et al.

(10) Patent No.: US 7,418,202 B2
(45) Date of Patent: Aug. 26, 2008

(54) ARTICLE HAVING A BIREFRINGENT SURFACE AND MICROSTRUCTURED FEATURES HAVING A VARIABLE PITCH OR ANGLES FOR USE AS A BLUR FILTER

(75) Inventors: Rolf W. Biernath, Wyoming, MN (US); Robert L. Brott, Woodbury, MN (US); William Ward Merrill, White Bear Lake, MN (US); John S. Huizinga, Dellwood, MN (US); William B. Black, Eagan, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 479 days.

(21) Appl. No.: 11/196,887

(22) Filed: Aug. 4, 2005

(65) Prior Publication Data
US 2007/0031140 A1    Feb. 8, 2007

(51) Int. Cl.
G03B 7/099     (2006.01)
G03B 17/18     (2006.01)
H04N 9/083     (2006.01)
H04N 5/335     (2006.01)
G02B 27/28     (2006.01)

(52) U.S. Cl. ........................ 396/268; 348/290; 348/335; 359/495; 359/497; 359/575; 359/576

(58) Field of Classification Search ................. 396/268, 396/101, 209, 241, 275, 307; 348/335, 256, 348/224.1, 270, 273, 290, 342, 360; 359/486, 359/501, 575, 576, 494–497, 569
See application file for complete search history.

(56) References Cited

U.S. PATENT DOCUMENTS 2,618,012 A    11/1952    Milne (Continued)

FOREIGN PATENT DOCUMENTS

CA    2191072    10/1996

(Continued)

OTHER PUBLICATIONS

Davis, Jeffrey A. et al., *Polarization Beam splitters using Polarization Diffraction Gratings*, Optics Letters, vol. 26, No. 9, pp. 587-589, May 1, 2001.

(Continued)

*Primary Examiner*—Melissa Jan Koval
(74) *Attorney, Agent, or Firm*—Lance Vietzke

(57) ABSTRACT

An optical low pass filter or blur filter, and method of making the filters, using an article having a birefringent surface for refracting incoming light when used with an image sensor. The birefringent surface of the article, such as a film, is structured or tilted such that, when the blur filter is placed within an optical path between a lens and the image sensor, the birefringent surface causes refraction of a light signal in the optical path into multiple light signals each being incident upon different sub-pixels within the pixels in the image sensor to prevent or reduce artifacts, such as undesirable color moiré effects, in the resulting digital image. The structures on the surface have a variable pitch or angles. The variable pitch can include a periodic, aperiodic, or quasi-aperiodic pitch, to reduce diffractive artifacts in the resulting image.

19 Claims, 16 Drawing Sheets

U.S. PATENT DOCUMENTS

| | | |
|---|---|---|
| 2,988,772 A | 6/1961 | Horn |
| 3,213,753 A | 10/1965 | Rogers |
| 3,357,773 A | 12/1967 | Rowland |
| 3,441,638 A | 4/1969 | Patchell |
| 3,502,766 A | 3/1970 | Motohiro |
| 3,528,723 A | 9/1970 | Rogers |
| 3,594,457 A | 7/1971 | Wright |
| 3,635,631 A | 1/1972 | Fields |
| 3,807,004 A | 4/1974 | Anderson |
| 3,832,267 A | 8/1974 | Liu |
| 3,842,152 A | 10/1974 | Wiffield |
| 3,871,947 A | 3/1975 | Brekken |
| 3,890,421 A | 6/1975 | Habozit |
| 3,911,479 A | 10/1975 | Sakurai |
| 3,956,450 A | 5/1976 | Abe |
| 3,998,916 A | 12/1976 | Van Turnhout |
| 4,062,918 A | 12/1977 | Nakanose |
| RE30,782 E | 10/1981 | Van Turnhout |
| 4,330,499 A | 5/1982 | Von unk zu Aufsess |
| 4,349,500 A | 9/1982 | Yazawa |
| 4,434,128 A | 2/1984 | Okada |
| 4,434,199 A | 2/1984 | Fair |
| 4,446,305 A | 5/1984 | Rogers |
| 4,520,189 A | 5/1985 | Rogers |
| 4,521,588 A | 6/1985 | Rogers |
| 4,525,317 A | 6/1985 | Rogers |
| 4,525,413 A | 6/1985 | Rogers |
| 4,539,256 A | 9/1985 | Shipman |
| 4,582,885 A | 4/1986 | Barber |
| RE32,171 E | 6/1986 | Van Turnhout |
| 4,601,861 A | 7/1986 | Pricone |
| 4,734,335 A | 3/1988 | Monzer |
| 4,770,490 A | 9/1988 | Gruenewald |
| 4,799,131 A | 1/1989 | Aho et al. |
| 4,799,137 A | 1/1989 | Aho |
| 4,810,381 A | 3/1989 | Hagen |
| 4,824,718 A | 4/1989 | Hwang |
| 4,853,602 A | 8/1989 | Hommes |
| 4,862,564 A | 9/1989 | Kwack |
| 4,867,881 A | 9/1989 | Kinzer |
| 4,886,713 A | 12/1989 | Ostermann |
| 5,056,030 A | 10/1991 | Tomita |
| 5,056,892 A | 10/1991 | Cobb, Jr. |
| 5,108,814 A | 4/1992 | Harp |
| 5,175,030 A | 12/1992 | Lu et al. |
| 5,385,769 A | 1/1995 | Wicks |
| 5,555,129 A | 9/1996 | Konno et al. |
| 5,614,286 A | 10/1997 | Meyers |
| 5,701,005 A | 12/1997 | Meyers |
| 5,731,886 A | 3/1998 | Taber |
| 5,737,125 A | 4/1998 | Ohashi |
| 5,771,328 A | 6/1998 | Wortman |
| 5,776,343 A | 7/1998 | Cullen |
| 5,792,411 A | 8/1998 | Morris et al. |
| 5,820,779 A | 10/1998 | Shouji et al. |
| 5,826,314 A | 10/1998 | Aihara |
| 5,882,774 A | 3/1999 | Jonza et al. |
| 5,900,977 A | 5/1999 | Hikmet |
| 5,905,826 A | 5/1999 | Benson, Jr. |
| 5,919,551 A * | 7/1999 | Cobb et al. ............... 428/156 |
| 5,936,773 A * | 8/1999 | Togino ..................... 359/630 |
| 5,962,114 A | 10/1999 | Jonza |
| 5,965,247 A | 10/1999 | Jonza |
| 6,075,581 A | 6/2000 | Shirochi |
| 6,096,247 A | 8/2000 | Ulsh et al. |
| 6,111,696 A | 8/2000 | Allen et al. |
| 6,247,986 B1 | 6/2001 | Chiu |
| 6,256,146 B1 | 7/2001 | Merrill |
| 6,278,552 B1 | 8/2001 | Ishihara et al. |
| 6,280,824 B1 | 8/2001 | Insley |
| 6,358,457 B1 | 3/2002 | Wong |
| 6,366,335 B1 | 4/2002 | Hikmet |
| 6,376,065 B1 | 4/2002 | Korba et al. |
| 6,461,003 B1 | 10/2002 | Neudeck |
| 6,560,026 B2 | 5/2003 | Gardiner et al. |
| 6,609,795 B2 | 5/2003 | Gardiner |
| 6,616,887 B2 | 9/2003 | Chiu |
| 6,621,533 B2 | 9/2003 | Slack et al. |
| 6,641,767 B2 | 11/2003 | Zhang et al. |
| 6,646,802 B2 | 11/2003 | Yamamoto |
| 6,692,823 B2 | 2/2004 | Kody |
| 6,700,695 B2 | 3/2004 | Engler |
| 6,788,463 B2 | 9/2004 | Merrill |
| 6,808,658 B2 | 10/2004 | Stover |
| 6,811,274 B2 | 11/2004 | Olczak |
| 6,963,448 B1 * | 11/2005 | Hayakawa .................. 359/494 |
| 2001/0036546 A1 | 11/2001 | Kaytor |
| 2001/0040731 A1 | 11/2001 | Bacon |
| 2002/0054258 A1 | 5/2002 | Kondo et al. |
| 2003/0058383 A1 | 3/2003 | Jagt et al. |
| 2003/0067091 A1 | 4/2003 | Krumm |
| 2003/0071947 A1 | 4/2003 | Shiraogawa |
| 2003/0214728 A1 | 11/2003 | Olczak |
| 2004/0005451 A1 | 1/2004 | Kretman |
| 2004/0116033 A1 | 6/2004 | Ouderkirk |
| 2004/0130057 A1 | 7/2004 | Mehrabi |
| 2004/0142150 A1 | 7/2004 | Bharadwaj |
| 2004/0189908 A1 | 9/2004 | Kawamoto |
| 2004/0233526 A1 | 11/2004 | Kaminsky et al. |
| 2004/0234724 A1 | 11/2004 | Kaminsky et al. |
| 2004/0240777 A1 | 12/2004 | Woodgate |
| 2005/0059766 A1 | 3/2005 | Jones |
| 2006/0138694 A1 | 6/2006 | Biernath |
| 2006/0138702 A1 | 6/2006 | Biernath |
| 2006/0139476 A1 | 6/2006 | Sasaki |
| 2006/0141218 A1 | 6/2006 | Biernath |
| 2006/0141219 A1 | 6/2006 | Biernath |
| 2006/0141220 A1 | 6/2006 | Merrill |
| 2006/0204720 A1 | 9/2006 | Biernath |
| 2007/0013103 A1 | 1/2007 | Zhang |
| 2007/0065636 A1 | 3/2007 | Merrill |

FOREIGN PATENT DOCUMENTS

| | | |
|---|---|---|
| DE | 10064520 | 7/2002 |
| EP | 0 698 804 | 2/1996 |
| EP | 0 736 782 | 10/1996 |
| EP | 0 769 879 | 4/1997 |
| EP | 1 104 181 | 5/2001 |
| EP | 1223460 | 7/2002 |
| EP | 1408349 | 4/2004 |
| EP | 1498770 | 1/2005 |
| GB | 1526722 | 9/1978 |
| GB | 1526723 | 9/1978 |
| GB | 1526724 | 9/1978 |
| JP | 57-131530 | 11/1982 |
| JP | 58-045928 | 6/1983 |
| JP | 59-120424 | 11/1984 |
| JP | 63-287921 | 11/1988 |
| JP | 05-011113 | 1/1993 |
| JP | 05-011114 | 1/1993 |
| JP | 05-241021 | 9/1993 |
| JP | 05-288931 | 11/1993 |
| JP | 05-288932 | 11/1993 |
| JP | 06 175073 | 6/1994 |
| JP | 11-344604 | 12/1999 |
| JP | 2002-090527 | 3/2002 |
| JP | 2003-207628 | 7/2003 |
| JP | 2006-072112 | 3/2006 |
| WO | WO 92/11996 | 7/1992 |
| WO | WO 97/39369 | 10/1997 |
| WO | WO 98/39755 | 9/1998 |
| WO | WO 99/37626 | 7/1999 |
| WO | WO 00/29197 | 5/2000 |

| WO | WO 01/27663 | 4/2001 |
| WO | WO 02/04858 | 1/2002 |
| WO | WO 02/096621 | 12/2002 |
| WO | WO 02/096622 | 12/2002 |
| WO | WO 03/041817 A1 | 5/2003 |
| WO | WO 03/101698 A1 | 12/2003 |
| WO | WO 2004/039551 | 5/2004 |
| WO | WO 2004/051705 | 6/2004 |
| WO | WO 2004/062904 | 7/2004 |
| WO | WO 2004/079414 | 9/2004 |
| WO | WO 2006/071616 | 7/2006 |
| WO | WO 2006/107621 | 10/2006 |

OTHER PUBLICATIONS

Liu, Rong, et al., *Optimal Design of Polarizing Beam Splitters with a Birefringent Substrate*, J. Opt. Soc. Am. A, vol. 14, No. 1, pp. 49-53, Jan. 1997.

Biernath et al, U.S. Appl. No. 11/050,616, "Article Having a Birefringent Surface for Use as a Blur Filter", filed Feb. 2, 2005.

Biernath et al, U.S. Appl. No. 11/050,527, "Article Having a Birefringent Surface for Use as a Blur Filter", filed Feb. 2, 2005.

Biernath et al, U.S. Appl. No. 11/050,616.

Cakmak et al., "Optical Properties of Simultaneous Biaxially Stretched Poly(Ethylene and Terephthalate) Films", *Polymer Engineering and Science,* vol. 29, No. 21 (Mid-Nov. 1989), pp. 1534-1543.

Liu et al., "Polarization device employing the combination effect of double refraction and diffraction", *Applied Physics Letters,* vol. 67, No. 14 (Oct. 2, 1995), pp. 1972-1974.

Bakeev et al., "Fabricating polymeric substrates with periodic microrelief and investigating their optical properties", *Journal of Optical Technology,* vol. 68, No. 9 (Sep. 2001), pp. 709-713.

Jagt et al., "Micro-structured Polymeric Linearly Polarized Light Emitting Lightguide for LCD Illumination", SID Symposium Digest of Technical Papers—May 2002, vol. 33, Issue 1, pp. 1236-1239.

Cornelissen et al., "Polarized Light LCD Backlight Based on Liquid Crystalline Polymer Film: A New Manufacturing Process", SID Symposium Digest of Technical Papers—May 2004, vol. 35, Issue 1, pp. 1178-1181.

Chien et al., "Polarized backlight based on selective total internal reflection at microgrooves", *Applied Optics,* vol. 43, No. 24 (Aug. 20, 2004), pp. 4672-4676.

* cited by examiner

ARTICLE HAVING A BIREFRINGENT SURFACE AND MICROSTRUCTURED FEATURES HAVING A VARIABLE PITCH OR ANGLES FOR USE AS A BLUR FILTER

FIELD OF INVENTION

The present invention relates to an article having a birefringent surface with variable pitch or angle microstructures for use as a blur filter with image sensors in order to reduce artifacts in a resulting image.

BACKGROUND

Photographic color distortion and color banding in digital imaging are induced by the interaction between image patterns and image color sensor patterns. These undesirable effects are a consequence of having repetitive image features on order of the size of the individual pixel sensors and from sharp edges representing an abrupt change in color. Since real-world pattern spacing never quite matches the digital sensor patterns, the color that is overweighted will vary spatially through the picture in correspondence to how out of phase the two patterns are from each other. Typically, this causes the colors to cycle and results in rainbow-like color distortions and other artifacts in the displayed digital image, often referred to as moiré effects.

There are several approaches to resolving color moiré effects: computational post-processing, sensor array modifications, and specialty filters. Of these approaches, digital computational post-processing methods include using software such as the ADOBE PHOTOSHOP program, requiring that a user manually resolve the color moiré through digital filters and selection, an often time-consuming and cumbersome approach that can require a high degree of expertise and results in a degraded image. Performing post-processing within the camera requires a powerful microprocessor and large amounts of working memory, contrary to low-cost and fast picture taking. It also requires assumptions to be made regarding the nature of the incoming image which may not hold true.

Modifying the sensor array to solve the moiré effects is also a viable, although expensive, approach and is not guaranteed to resolve the effects. One such approach involves a hexagonal sensor arrangement, rather than a square arrangement, which appears to be less sensitive to color moiré. However, instead of eliminating the moiré effects, the hexagonal sensor arrangement changes the patterns to which it is sensitive, causing other undesirable effects. Yet another approach involves a CMOS-based sensor that senses red green and blue at each pixel without relying on color filters. This approach uses a three-level sensor, in the direction of the incoming light signal, that takes advantage of the different penetration depths of light in the red, green, and blue wavelengths. However, this approach can result in high manufacturing costs and difficult reliability issues, requiring an integrated circuit having a trilayer stack of transistors, each of which operates within very tight specifications.

Other approaches involve the use of specialty filters to optically solve the problem, including optical low pass filters, often referred to as blur filters. A conventional optical solution uses liquid crystalline polymers or a stack of inorganic plates, for example quartz plates, each of which have been ground in such a way as to expose the asymmetry of the quartz axis and create a birefringent walk-off plate stack. Typically, the walk-off plate laterally displaces one state of polarization from another. These plates are stacked in different orientations to obtain the desired blur pattern and are placed within the optical path between a lens and image sensor. The plate stack is usually two or more millimeters in thickness, typically far too thick to be included in mobile phones or personal digital assistants having digital cameras. Also, the quartz plates can be expensive for certain implementations and tend to break easily, making them difficult to handle and not particularly well-suited to mobile devices.

Yet another approach to the making of a blur filter uses a diffraction grating. A plate with an array of structures is placed in the optical path between the lens and the sensor. The diffraction grating modifies the phase relationships in the incoming light and creates a pattern of constructive and destructive interference. The interference pattern effectively spreads a portion of the incoming light to higher angles. For example, a collimated beam of light that would otherwise appear as a concentrated spot across a small angular domain is spread into several spots over a wider area. Blur filters of this type have been described, for example, in U.S. Pat. No. 4,998,800.

An undesirable effect occurring in image sensors includes anomalous variations in intensity resulting from diffraction of the incoming light signal, and arising, for example, from higher order diffraction peaks. One approach to reduce these anomalies, including color anomalies, involves using "blazed transmission grating" equations to find pitches that reduce or eliminate the anomalies. The difficulty with this approach is that for small pitches, the solutions only optimize for single wavelengths; thus, diffraction can be eliminated for the color red, for example, but may still be severe for the color blue. The blazed grating equations are less sensitive to wavelength for large pitches, allowing a reasonable optimization for all visible wavelengths. However, with large pitches (e.g., 250 microns) the groove depth becomes deeper (e.g., 26 microns) and begins to project onto the sensor imaging surface, an undesirable situation.

SUMMARY OF INVENTION

A blur filter consistent with the present invention includes (a) a body having (i) first and second surfaces, and (ii) first and second in-plane axes that are orthogonal with respect to each other and a third axis that is mutually orthogonal to the first and second in-plane axes in a thickness direction of the body; and (b) a portion of the first surface being a structured surface having a variable pitch or having features with variable angles. The portion of the first surface is structured such that, when the blur filter is placed within an optical path between a lens and an image sensor, the structured surface spreads a light signal in the optical path into a plurality of light signals being at least partially spatially separated when incident upon the image sensor.

A method of making a blur filter consistent with the present invention includes the steps of (a) providing a body having (i) first and second surfaces, and (ii) first and second in-plane axes that are orthogonal with respect to each other and a third axis that is mutually orthogonal to the first and second in-plane axes in a thickness direction of the body; and (b) forming a birefringent structured surface having a variable pitch on a portion of the first surface. The method produces the birefringent structured surface such that, when the blur filter is placed within an optical path between a lens and an image sensor, the structured surface spreads a light signal in the optical path into a plurality of light signals being at least partially spatially separated when incident upon the image sensor.

An optical package having a blur filter consistent with the present invention includes a housing having a first end with an aperture, a second end with an aperture, and an interior portion that defines an optical path. The package also includes a lens within the first end such that, when the package is placed over an image sensor with the aperture in the second end positioned adjacent the image sensor, the lens focuses incoming light onto the image sensor. A blur filter is positioned in the optical path of the interior portion between the first and second ends of the housing. The blur filter in the optical package includes (a) a body having (i) first and second surfaces, and (ii) first and second in-plane axes that are orthogonal with respect to each other and a third axis that is mutually orthogonal to the first and second in-plane axes in a thickness direction of the body; and (b) a portion of the first surface being a birefringent structured surface having a variable pitch. The portion of the first surface is structured such that, when the package is placed over the image sensor for the lens to focus the incoming light onto the image sensor, the birefringent structured surface spreads a light signal in the optical path into a plurality of light signals being at least partially spatially separated when incident upon the image sensor.

Other blur filters consistent with the present invention can use a birefringent body having non-structured surfaces and positioned within the optical path between a lens and an image sensor at a non-zero angle to the optical path.

The geometric feature or features replicated for use in a blur filter may be, for example, either a prismatic, lenticular, or sinusoidal geometric feature. The geometric feature or features may be continuous or discontinuous both widthwise and lengthwise. It may be a macro- or a micro-feature. It may have a variety of cross-sectional profiles as discussed more fully below. The geometric feature may be repeating or non-repeating on the replicated structured surface. The replicated surface may comprise a plurality of geometric features that have the same cross-sectional shape. Alternatively, it may have a plurality of geometric features that have different cross-sectional shapes.

As used herein, the following terms and phrases have the following meaning.

"Birefringent surface" means a surface portion of a body proximate a birefringent material in the body.

"Cross-sectional shape", and obvious variations thereof, means the configuration of the periphery of the geometric feature defined by the second in-plane axis and the third axis. The cross-sectional shape of the geometric feature is independent of its physical dimension.

"Dispersion" means the variation of refractive index with wavelength. Dispersion may vary along different axes differently in an anisotropic material.

"Stretch ratio", and obvious variations thereof, means the ratio of the distance between two points separated along a direction of stretch after stretching to the distance between the corresponding points prior to stretching.

"Geometric feature", and obvious variations thereof, means the predetermined shape or shapes present on the structured surface.

"Macro" is used as a prefix and means that the term that it modifies has a cross-sectional profile that has a height of greater than 1 mm.

"Pitch" for a array of periodic structures means the distance, measured parallel to the second in-plane axis, between succeeding peaks or succeeding valleys as projected onto a common film body plane. Pitch, for an array of variable structures, means the distance, measured parallel to the second in-plane axis, between relative maxima or relative minima of succeeding geometric features.

"Mean pitch" means an average of the distribution of a plurality of pitches.

"Metallic surface" and obvious variations thereof, means a surface coated or formed from a metal or a metal alloy which may also contain a metalloid. "Metal" refers to an element such as iron, gold, aluminum, etc., generally characterized by ductility, malleability, luster, and conductivity of heat and electricity which forms a base with the hydroxyl radical and can replace the hydrogen atom of an acid to form a salt. "Metalloid" refers to nonmetallic elements having some of the properties of a metal and/or forming an alloy with metal (for example, semiconductors) and also includes nonmetallic elements which contain metal and/or metalloid dopants.

"Micro" is used as a prefix and means that the term it modifies has a cross-sectional profile that has a height of 1 mm or less. Preferably the cross-sectional profile has a height of 0.5 mm or less. More preferably the cross-sectional profile is 0.05 mm or less.

"Oriented" means having an anisotropic dielectric tensor with a corresponding anisotropic set of refractive indices.

"Orientation" means a state of being oriented.

"Uniaxial orientation" means that two of the principal refractive indices are substantially the same.

"Uniaxial stretch", including obvious variations thereof, means the act of grasping opposite edges of an article and physically stretching the article in only one direction. Uniaxial stretch is intended to include slight imperfections in uniform stretching of the film due to, for example, shear effects that can induce momentary or relatively very small biaxial stretching in portions of the film. Truly uniaxial stretching refers to a special sub-set of uniaxial stretching in which the material is relatively unconstrained in the in-plane film direction orthogonal to the stretch direction, resulting in uniaxial orientation.

"Structure surface" means a surface that has at least one geometric feature thereon.

"Structured surface" means a surface that has been created by any technique that imparts a desired geometric feature or plurality of geometric features to a surface.

"Variable angles" means that not all the features on the same article or film sharing a geometrical resemblance in cross section have the same angle of inclination for the corresponding cross-sectional sides of the identifiable features formed between a given side, extended as needed, and the film body plane.

In many particular cases, the feature may resemble, e.g. approximate, simple geometric shapes. For example, in cross-section, the features may resemble simple geometric polygons, such as triangles or quadrilaterals. Such features have discernable sides and vertices. In practice, the sides may be curved or "wiggly" and the vertices may be rounded but the general geometrical shape remains discernable. In many of these cases, an average slope of inclination can be discerned, e.g. by fitting a line through a middle portion of the side that excludes the vagaries introduced by the imperfect or designed rounding at the peak (maximum with respect to film body) and/or valley (minimum with respect to film body) of this side.

Likewise, apex angles for the various vertices may be estimated by extending and connecting such lines representing the two sides bounding and defining each of these vertices. In this context, "variable angles" means that not all the features on the same article or film sharing a geometrical resemblance in cross section have the same angle of inclination for the corresponding cross-sectional sides of the identifiable features formed between a given side, extended as needed, and the film body plane and/or that the various apex angles of the corresponding vertices vary between the features. In other such cases, the middle portion of the side is deliberately designed with a particular curvature, e.g. the curvature of the side proceeds approximately from the valley to the peak along the cross-sectional edge according to an idealized parametric equation. In this context, "variable angles" also includes the variation of parametric starting and ending points on the idealized curve from the valley to peak of the corresponding sides among the various features.

"Wavelength" means the equivalent wavelength measured in a vacuum.

In the case of layered films, "uniaxial" or "truly uniaxial" are intended to apply to individual layers of the film unless otherwise specified.

In terms of pitch:

"aperiodic" means no regular repeating pattern, e.g. the distribution of pitches has no regular or periodic spacing;

"quasi-aperiodic" means that over a defined length scale (which may range from 1 mm to several meters), the collection of surface features has an aperiodic pitch progression; a quasi-aperiodic distribution can be formed by repeating a specific aperiodic pattern over a longer length scale to make a progression of surface features over a much larger scale (e.g. 1 cm to 100 cm to 10 m); and "random" means no deliberate sequence, except as constrained by a chosen mean and a distribution function.

A random progression of pitches for a film with a collection of surface features can be derived by choosing a mean value for the pitch and a distribution function of allowed values about that mean value. The distribution function can take various forms, e.g. a Poisson, a truncated normal distribution (e.g., by choosing upper and lower bounds and re-normalizing) or a uniform distribution. A uniform distribution provides an equal probability for all values between specified upper and lower bounds. For example, the 10% random case of the Examples has a mean pitch and upper and lower bounds of +10% and −10% about that mean. The 100% random case of the Examples has a mean pitch and upper and lower bounds of +100% (i.e. twice the mean value) and −100% (i.e. essentially zero) about that mean. A pseudo-random pattern is often taken as a particular progression derived by choosing the mean and distribution and evolving the progression by realizing successive pitch values using a random or pseudo-random number generator. In the context of this specification, the term random may imply such a pseudo-random sequence.

BRIEF DESCRIPTION OF THE DRAWINGS

The invention may be more completely understood in the following detailed description of various embodiments of the invention in connection with the accompanying drawings, in which.

Figure 1:
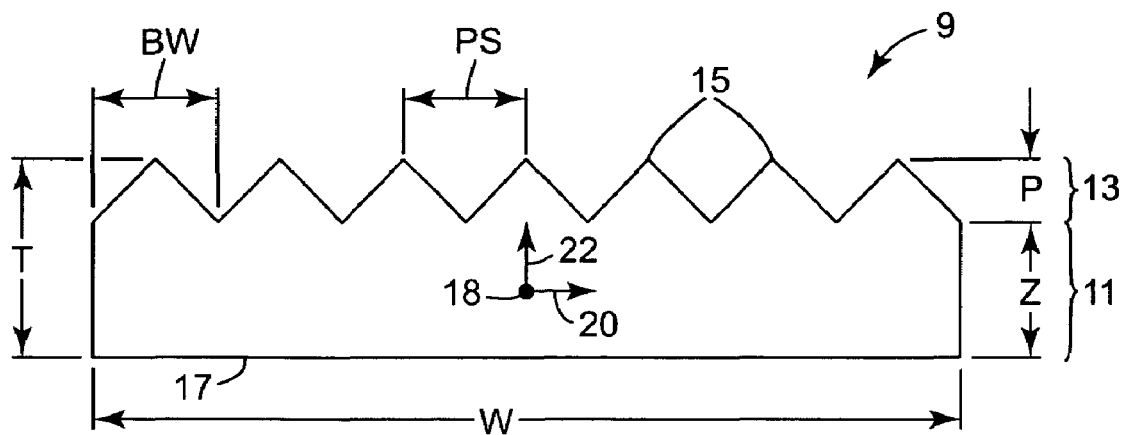
FIG. 1 is a sectional view of a film made by one method.

The invention is amenable to various modifications and alternative forms. Specifics of the invention are shown in the drawings by way of example only. The intention is not to limit the invention to the particular embodiments described. Instead, the intention is to cover all modifications, equivalents, and alternatives falling within the spirit and scope of the invention.

DETAILED DESCRIPTION

Microstructured Articles

Figure 2A:
FIGS. 2A-2E are cross-sectional views of some alternative embodiments of an article.
Figure 2B:
Figure 2C:
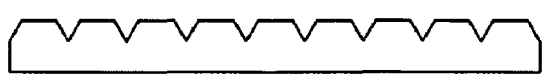
Figure 2D:
Figure 2E:
Figure 3A:
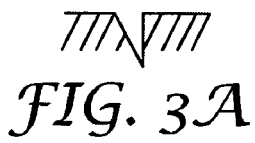
FIGS. 3A-3W illustrate sectional views of some alternative profiles of geometric features that can be made by one method.
Figure 3B:
Figure 3C:
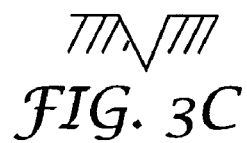
Figure 3D:
Figure 3E:
Figure 3F:
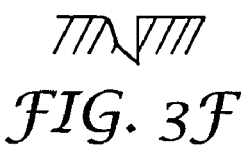
Figure 3G:
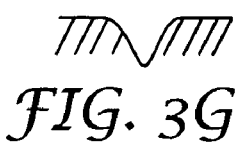
Figure 3H:
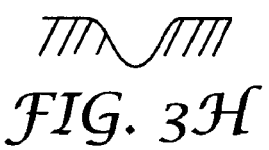
Figure 3I:
Figure 3J:
Figure 3K:
Figure 3L:
Figure 3M:
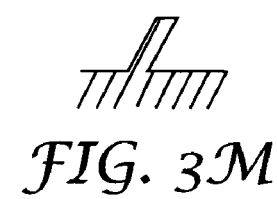
Figure 3N:
Figure 3O:
Figure 3P:

The articles and films made by one exemplary process generally comprise a body portion and a surface structure portion. FIG. 1 represents end views of a film made according to various embodiments. FIGS. 2A-2E illustrate cross-sectional views of some alternative embodiment films that can be made by one particular process. FIGS. 3A-3W illustrate some alternative embodiments of geometric features of articles having structured surfaces.

Referring to FIG. 1, film 9 comprises a body or land portion 11 having a thickness (Z) and a surface portion 13 having a height (P). Surface portions 13 comprises a series of parallel geometric features 15 generally continuous in the groove direction, here shown as right angle prisms. Geometric features 15 each have a basal width (BW) and a peak-to-peak spacing (PS). The film has a total thickness T which is equal to the sum of P+Z. The basal width generally denotes the valley-to-valley spacing between features, for example as projected onto a common plane in the film body.

Body or land portion 11 comprises the portion of the article between bottom surface 17 of the film 9 and the lowest point of the surface portion 13. In some cases, this may be a constant dimension across the width (W) of the article. In other cases, this dimension may vary due to the presence of geometric features having varying peak heights or valley depths. See FIG. 2E.

Film 9 has a first in-plane axis 18, a second in-plane axis 20 and a third axis 22. In FIG. 1, the first in-plane axis 18 is substantially parallel to the length of the geometric feature 15. In FIG. 1, the first in-plane axis is normal to the end of film 9. These three axes are mutually orthogonal with respect to one another.

In general, the film is the result of a stretching process. The film may be unoriented (isotropic), uniaxially oriented, or biaxially oriented. The features may be imparted to the film before or after stretching by a variety of methods. In some instances, uniaxially oriented films are preferred.

Various methods can be used to make a uniaxially oriented film. Uniaxial orientation may be measured by determining the difference in the index of refraction of the film along the first in-plane axis ($n_1$), the index of refraction along the second in-plane axis ($n_2$), and the index of refraction along the third axis ($n_3$). Uniaxially oriented films made by the method can have $n_1 \neq n_2$ and $n_1 \neq n_3$. Additionally, $n_2$ and $n_3$ are substantially the same as one another relative to their differences to $n_1$. A film preferably made by one particular method can be truly uniaxially oriented.

A method may also be used to provide a film that has a relative birefringence for a wavelength of interest of 0.3 or less. In another embodiment, the relative birefringence is less than 0.2 and in yet another embodiment it is less than 0.1. Relative birefringence is an absolute value determined according to the following expression:

$$|n_2 - n_3| / |n_1 - (n_2 + n_3)/2|$$

A method can be used to make films that have at least two prismatic or lenticular geometric features. The geometric feature may be an elongate structure that is typically parallel to the first in-plane axis of the film. As shown in FIG. 1, the structured surface comprises a series of right angle prisms 15. However, other geometric features and combinations thereof may be used. See, for example, FIGS. 2A-2E and FIGS. 3A-3W. FIG. 2A shows that the geometric features do not need to touch each other at their bases. FIG. 2B shows that the geometric features may have rounded peaks and curved facets. FIG. 2C shows that the peaks of the geometric features may be flat. FIG. 2D shows that opposing surfaces of the film each may have a structured surface. FIG. 2E shows that the geometric features may have varying land thicknesses, peak heights, and basal widths.

FIGS. 3A-3W illustrate other cross-sectional shapes that may be used to provide the structured surface. These Figures further illustrate that the geometric feature may comprise a depression (See FIGS. 3A-I and 3T) or a projection (see FIGS. 3J-3S and 3U-W). In the case of features that comprise depressions, the elevated area between depressions may be considered to be a projection-type feature as shown in FIG. 2C.

Various methods may be used to provide various feature embodiments that may be combined in any manner so as to achieve a desired result. For example horizontal surfaces may separate features that have radiused or flat peaks. Moreover curved faces may be used on any of these features.

As can be seen from the Figures, the methods may be used to provide features of any desired geometric shape. They may be symmetric or asymmetric with respect to the z-axis (thickness) of the film. They may comprise a single feature, a plurality of the same feature in a desired pattern, or a combination of two or more features arranged in a desired pattern. Additionally, the dimensions, such as height and/or width, of the features may be the same across the structured surface. Alternatively, they may vary from feature to feature.

One process of making a structured article includes providing a polymeric resin that is capable of having a desired structured surface imparted to it by embossing, casting, extrusion or other non-machining techniques, which involve no cutting or other shaping of a solid material; rather, a flow mechanism of a fluid or visco-elastic material is shaped through the process then fixed into a solid. The structured surface may either be provided concurrently with the formation of the desired article or it may be imparted to a first surface of the resin after the article has been formed. The process will be further explained with regard to FIG. 4.

Figure 4:
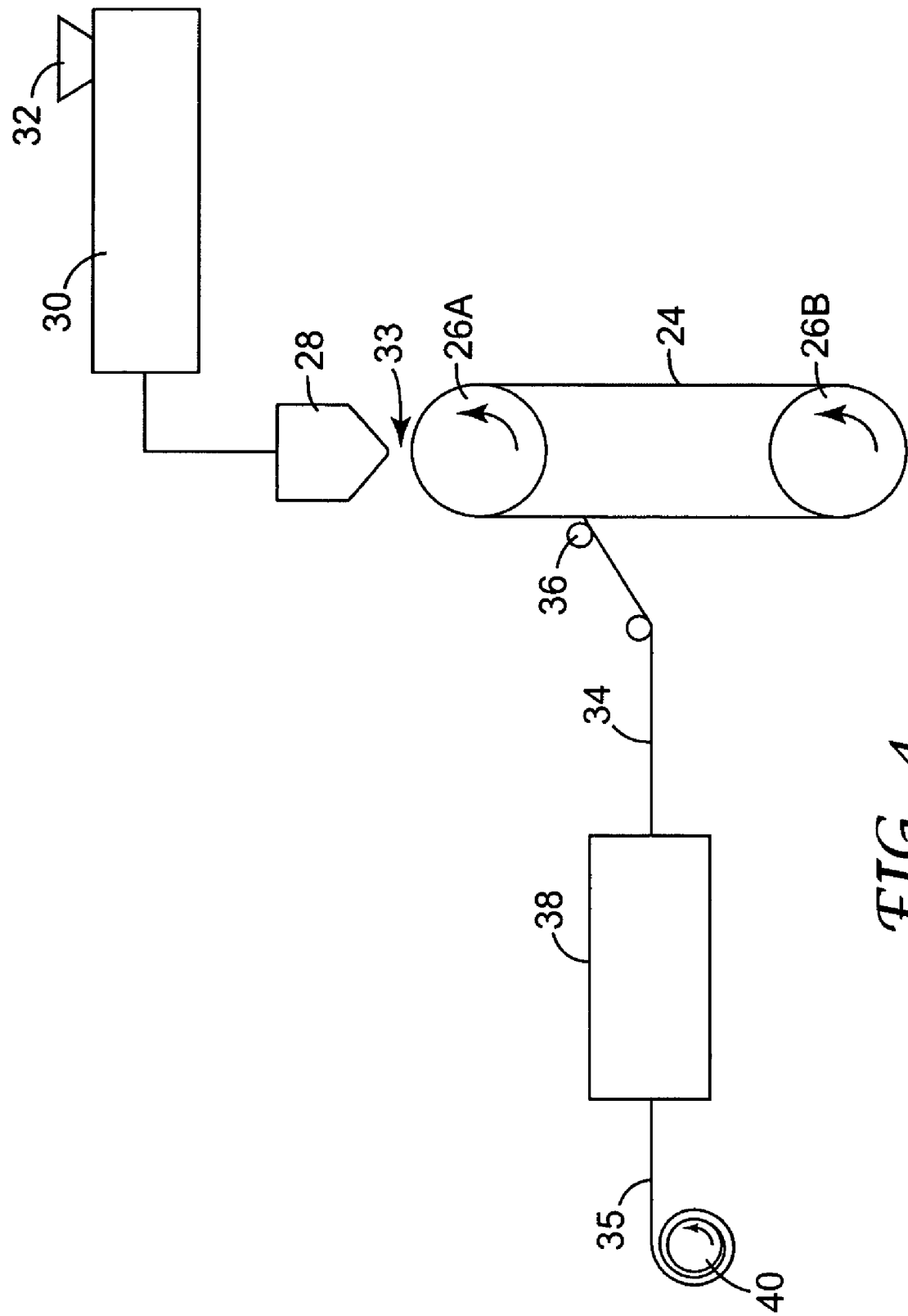
FIG. 4 is a schematic representation of one process for making a structured film.

FIG. 4 is a schematic representation of one method of making a film with a structured surface. In the method, a tool 24 comprising a negative version of the desired structured surface of the film is provided and is advanced by means of drive rolls 26A and 26B past an orifice (not shown) of die 28. Die 28 comprises the discharge point of a melt train, here comprising an extruder 30 having a feed hopper 32 for receiving dry polymeric resin in the form of pellets, powder, etc. Molten resin exits die 28 onto tool 24. A gap 33 is provided between die 28 and tool 24. The molten resin contacts the tool 24 and hardens to form a polymeric film 34. The leading edge of the film 34 is then stripped from the tool 24 at stripper roll 36. Subsequently, film 34 may be directed to stretching apparatus 38 if desired at this point. The film 34 may then be wound into a continuous roll at station 40.

A variety of techniques may be used to impart a structured surface to the film. These include batch and continuous techniques. They involve providing a tool having a surface that is a negative of the desired structured surface; contacting at least one surface of the polymeric film to the tool for a time and under conditions sufficient to create a positive version of the desired structured surface to the polymer; and removing the polymer with the structured surface from the tool. Typically the negative surface of the tool comprises a metallic surface, frequently with a release agent applied.

Although the die 28 and tool 24 are depicted in a vertical arrangement with respect to one another, horizontal or other arrangements may also be employed. Regardless of the particular arrangement, the die 28 provides the molten resin to the tool 24 at the gap 33.

The die 28 is mounted in a manner that permits it to be moved toward the tool 24. This allows one to adjust the gap 33 to a desired spacing. The size of the gap 33 is a function of the composition of the molten resin, its viscosity and the pressure necessary to essentially completely fill the tool with the molten resin.

The molten resin is of a viscosity such that it preferably substantially fills, optionally with applied vacuum, pressure, temperature, ultrasonic vibration or mechanical means, into the cavities of the tool 24. When the resin substantially fills the cavities of the tool 24, the resulting structured surface of the film is said to be replicated.

In the case that the resin is a thermoplastic resin, it is typically supplied as a solid to the feed hopper 32. Sufficient heat is provided by the extruder 30 to convert the solid resin to a molten mass. The tool is typically heated by passing it over a heated drive roll 26A. Drive roll 26A may be heated by, for example circulating hot oil through it or by inductively heating it. The temperature of the tool 24 at roll 26A is typically above the softening point of the resin but below its decomposition temperature.

In the case of a polymerizable resin, including a partially polymerized resin, the resin may be poured or pumped directly into a dispenser that feeds the die 28. If the resin is a reactive resin, the method can include one or more additional steps of curing the resin. For example, the resin may be cured by exposure to a suitable radiant energy source such as actinic radiation, for example ultraviolet light, infrared radiation, electron beam radiation, visible light, etc., for a time sufficient to harden the resin and remove it from the tool 24.

The molten film can be cooled by a variety of methods to harden the film for further processing. These methods include spraying water onto the extruded resin, contacting the unstructured surface of the tool with cooling rolls, or direct impingement of the film and/or tool with air.

The previous discussion was focused on the simultaneous formation of the film and the structured surface. Another useful technique comprises contacting a tool to the first surface of a preformed film. Pressure, heat, or pressure and heat are then applied to the film/tool combination until the surface of the film has softened sufficiently to create the desired structured surface in the film. Preferably, the surface of the film is softened sufficiently to completely fill the cavities in the tool. Subsequently, the film is cooled and removed from the master.

As noted previously, the tool comprises a negative version (i.e., the negative surface) of the desired structured surface. Thus, it comprises projections and depressions (or cavities) in a predetermined pattern. The negative surface of the tool can be contacted with the resin so as to create the geometric features on the structured surface in any alignment with respect to the first or second in-plane axes. Thus, for example, the geometric features of FIG. 1 may be aligned with either the machine, or length, direction, or the transverse, or width, direction of the article.

In one embodiment of the replication step, the cavities of the tool are at least 50% filled by the resin. In another embodiment, the cavities are at least 75% filled by the resin. In yet another embodiment, the cavities are at least 90% filled by the resin. In still another embodiment, the cavities are at least 95% filled by the resin. In another embodiment, the cavities are at least 98% filled by the resin.

Adequate fidelity to the negative may be achieved for many applications when the cavities are filled to at least 75% by the resin. However, better fidelity to the negative is achieved when the cavities are filled to at least 90% by the resin. The best fidelity to the negative is achieved when the cavities are filled to at least 98% by the resin.

The tool used to create the desired structured surface may have a coating comprising a fluorochemical benzotriazole on the negative surface. The presence of the fluorochemical is preferred; some polymers do not require that the fluorochemical be used while others do. The fluorochemical benzotriazole preferably forms a substantially continuous monolayer film on the tool. The phrase "substantially continuous monolayer film" means that the individual molecules pack together as densely as their molecular structures allow. It is believed that the films self assemble in that the triazole groups of the molecules attach to available areas of the metal/metalloid surface of the tool and that the pendant fluorocarbon tails are aligned substantially towards the external interface.

The effectiveness of a monolayer film and the degree to which a monolayer film is formed on a surface is generally dependent upon the strength of the bond between the compound and the particular metal or metalloid surface of the tool and the conditions under which the film-coated surface is used. For example, some metal or metalloid surfaces may require a highly tenacious monolayer film while other such surfaces require monolayer films having much lower bond strength. Useful metal and metalloid surfaces include any surface that will form a bond with compounds and preferably, form a monolayer or a substantially continuous monolayer film. Examples of suitable surfaces for forming said monolayer films include those comprising copper, nickel, chromium, zinc, silver, germanium, and alloys thereof.

The monolayer or substantially continuous monolayer film may be formed by contacting a surface with an amount of the fluorochemical benzotriazole sufficient to coat the entire surface. The compound may be dissolved in an appropriate solvent, the composition applied to the surface, and allowed to dry. Suitable solvents include ethyl acetate, 2-propanol, acetate, 2 propanol, acetone, water and mixtures thereof. Alternatively, the fluorochemical benzotriazole may be deposited onto a surface from the vapor phase. Any excess compound may be removed by rinsing the substrate with solvent and/or through use of the treated substrate.

The fluorochemical benzotriazoles not only have been found to chemically bond to metal and metalloid surfaces, they also provide, for example, release and/or corrosion inhibiting characteristics to those surfaces. These compounds are characterized as having a head group that can bond to a metallic or metalloid surface (such as a master tool) and a tail portion that is suitably different in polarity and/or functionality from a material to be released. These compounds form durable, self-assembled films that are monolayers or substantially monolayers. The fluorochemical benzotriazoles include those having the formula:

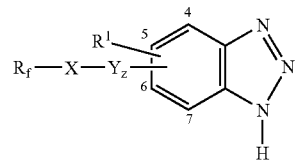

wherein $R_f$ is $C_nF_{2n+1}$—$(CH_2)_m$—, wherein n is an integer from 1 to 22 and m is 0, or an integer from 1 to 22 X is —$CO_2$—, —$SO_3$—, —CONH—, —O—, —S—, a covalent bond, —$SO_2NR$—, or —NR—, wherein R is H or $C_1$ to $C_5$ alkylene; Y is —$CH_2$— wherein z is 0 or 1; and R' is H, lower alkyl or $R_f$—X—$Y_z$— with the provisos that when X is —S—, or —O—, m is 0, and z is 0, n is $\geq 7$ and when X is a covalent bond, m or z is at least 1. Preferably n+m is equal to an integer from 8 to 20.

A particularly useful class of fluorochemical benzotriazole compositions for use as release agents comprising one or more compounds having the formula:

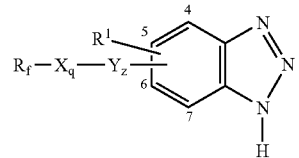

wherein $R_f$ is $C_nF_{2n+1}$—$(CH_2)_m$—, wherein n is 1 to 22, m is 0 or an integer from 1 to 22 X is —$CO_2$—, —$SO_3$—, —S—, —O—, —CONH—, a covalent bond, —SO$_2$NR—, or —NR—, wherein R is H or C$_1$ to C$_5$ alkylene, and q is 0 or 1; Y is C$_1$-C$_4$ alkylene, and z is 0 or 1; and R' is H, lower alkyl, or R$_f$—X—Y$_z$. Such materials are described in U.S. Pat. No. 6,376,065.

One process may include a stretching step. For example, the article may either be uniaxially (including monoaxially) or biaxially oriented. Additionally, the process may optionally include a preconditioning step prior to stretching such as providing an oven or other apparatus. The preconditioning step may include a preheating zone and a heat soak zone. The process may also include a post conditioning step. For example, the film may be first heat set and subsequently quenched.

In general, polymers used in the articles or bodies may be crystalline, semi-crystalline, liquid crystalline or amorphous polymers or copolymers. It should be understood that in the polymer art it is generally recognized that polymers are typically not entirely crystalline, and therefore in the context of the articles or bodies, crystalline or semi-crystalline polymers refer to those polymers that are not amorphous and includes any of those materials commonly referred to as crystalline, partially crystalline, semi-crystalline, etc. Liquid crystalline polymers, sometimes also referred to as rigid-rod polymers, are understood in the art to possess some form of long-range ordering which differs from three-dimensional crystalline order.

For the articles or bodies, any polymer either melt-processable or curable into film form may be used, which can be particularly useful due to its manufacturing process, or the stability, durability, or flexibility of a final article. These may include, but are not limited to, homopolymers, copolymers, and oligomers that can be cured into polymers from the following families: polyesters (e.g., polyalkylene terephthalates (e.g., polyethylene terephthalate, polybutylene terephthalate, and poly-1,4-cyclohexanedimethylene terephthalate), polyethylene bibenzoate, polyalkylene naphthalates (e.g. polthylene naphthalate (PEN) and isomers thereof (e.g., 2,6-, 1,4-, 1,5-, 2,7-, and 2,3-PEN)) and polybutylene naphthalate (PBN) and isomers thereof), and liquid crystalline polyesters); polyarylates; polycarbonates (e.g., the polycarbonate of bisphenol A); polyamides (e.g. polyamide 6, polyamide 11, polyamide 12, polyamide 46, polyamide 66, polyamide 69, polyamide 610, and polyamide 612, aromatic polyamides and polyphthalamides); polyether-amides; polyamide-imides; polyimides (e.g., thermoplastic polyimides and polyacrylic imides); polyetherimides; polyolefins or polyalkylene polymers (e.g., polyethylenes, polypropylenes, polybutylenes, polyisobutylene, and poly(4-methyl)pentene); ionomers such as Surlyn™ (available from E. I. du Pont de Nemours & Co., Wilmington, Del.); polyvinylacetate; polyvinyl alcohol and ethylene-vinyl alcohol copolymers; polymethacrylates (e.g., polyisobutyl methacrylate, polypropylmethacrylate, polyethylmethacrylate, and polymethylmethacrylate); polyacrylates (e.g., polymethyl acrylate, polyethyl acrylate, and polybutyl acrylate); polyacrylonitrile; fluoropolymers (e.g., perfluoroalkoxy resins, polytetrafluoroethylene, polytrifluoroethylene, fluorinated ethylene-propylene copolymers, polyvinylidene fluoride, polyvinyl fluoride, polychlorotrifluoroethylene, polyethylene-co-trifluoroethylene, poly(ethylene-alt-chlorotrifluoroethylene), and THV™ (3M Co.)); chlorinated polymers (e.g., polyvinylidene chloride and polyvinylchloride); polyarylether ketones (e.g., polyetheretherketone ("PEEK")); aliphatic polyketones (e.g., the copolymers and terpolymers of ethylene and/or propylene with carbon dioxide); polystyrenes of any tacticity (e.g., atactic polystyrene, isotactic polystyrene and syndiotactic polystyrene) and ring- or chain-substituted polystyrenes of any tacticity (e.g., syndiotactic poly-alpha-methyl styrene, and syndiotactic polydichlorostyrene); copolymers and blends of any of these styrenics (e.g., styrene-butadiene copolymers, styrene-acrylonitrile copolymers, and acrylonitrile-butadiene-styrene terpolymers); vinyl naphthalenes; polyethers (e.g., polyphenylene oxide, poly(dimethylphenylene oxide), polyethylene oxide and polyoxymethylene); cellulosics (e.g., ethyl cellulose, cellulose acetate, cellulose propionate, cellulose acetate butyrate, and cellulose nitrate); sulfur-containing polymers (e.g., polyphenylene sulfide, polysulfones, polyarylsulfones, and polyethersulfones); silicone resins; epoxy resins; elastomers (e.g, polybutadiene, polyisoprene, and neoprene), and polyurethanes. Blends or alloys of two or more polymers or copolymers may also be used.

It has been difficult to replicate surfaces using semicrystalline polymers, especially polyesters. Generally they adhere tenaciously to the tool during the replication process, unless treatments such as the fluorochemical benzotriazole coating described above are employed. As a result, they are difficult to remove from an untreated tool without causing damage to the replicated surface. Examples of semicrystalline thermoplastic polymers useful in the articles or bodies include semicrystalline polyesters. These materials include polyethylene terephthalate or polyethylene naphthalate. Polymers comprising polyethylene terephthalate or polyethylene naphthalate are found to have many desirable properties.

Suitable monomers and comonomers for use in polyesters may be of the diol or dicarboxylic acid or ester type. Dicarboxylic acid comonomers include but are not limited to terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-, 2,5-, 2,8-), bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6-decahydronaphthalene dicarboxylic acid and its isomers, bi- or multi-cyclic dicarboxylic acids (such as the various isomeric norbornane and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid), and any of the isomeric dicarboxylic acids of the fused-ring aromatic hydrocarbons (such as indene, anthracene, pheneanthrene, benzonaphthene, fluorene and the like). Other aliphatic, aromatic, cycloalkane or cycloalkene dicarboxylic acids may be used. Alternatively, esters of any of these dicarboxylic acid monomers, such as dimethyl terephthalate, may be used in place of or in combination with the dicarboxylic acids themselves.

Suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chain-ester diols such as 3-hydroxy-2,2-dimethylpropyl-3-hydroxy-2,2-dimethylpropyl-3-hydroxy-2,2-di methyl propanoate, cycloalkane glycols such as 1,4-cyclohexanedimethanol and its isomers and 1,4-cyclohexanediol and its isomers, bi- or multicyclic diols (such as the various isomeric tricyclodecane dimethanols, norbornane dimethanols, norbornene dimethanols, and bicyclo-octane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4'-dihydroxymethyl biphenyl and its isomers, and 1,3-bis(2-hydroxyethoxy)benzene and its isomers), and lower alkyl ethers or diethers of these diols, such as dimethyl or diethyl diols. Other aliphatic, aromatic, cycloalkyl and cycloalkenyl diols may be used.

Tri- or polyfunctional comonomers, which can serve to impart a branched structure to the polyester molecules, can also be used. They may be of either the carboxylic acid, ester, hydroxy or ether types. Examples include, but are not limited to, trimellitic acid and its esters, trimethylol propane, and pentaerythritol.

Also suitable as comonomers are monomers of mixed functionality, including hydroxycarboxylic acids such as parahydroxybenzoic acid and 6-hydroxy-2-naphthalenecarboxylic acid, and their isomers, and tri- or polyfunctional comonomers of mixed functionality such as 5-hydroxyisophthalic acid and the like.

Suitable polyester copolymers include copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethanol diol); (f) alkane dicarboxylic acids; and/or (g) cycloalkane dicarboxylic acids (e.g., cyclohexane dicarboxylic acid)), and copolymers of polyalkylene terephthalates (copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)). The copolyesters described may also be a blend of pellets where at least one component is a polymer based on one polyester and other component or components are other polyesters or polycarbonates, either homopolymers or copolymers.

In some embodiments of this invention, a particularly useful polymer is the product of extrusion of a polyester and a polycarbonate. It is widely believed that when polymers chosen from these two classes are extruded together, some transesterification takes place, but that transesterification is slow and unlikely to go to completion during extrusion, which would result in a truly random copolymer. Thus, polyester-polycarbonate extrusion can result in an extrudate which can range along a continuum from a two-component polymer blend to a homogeneous copolymer, but most typically results in an extrudate that has both some block copolymer character and some polymer blend character.

Variable Pitch Microstructured Birefringent Articles

A film having microstructures with a variable pitch or with features having variable angles, in certain embodiments, can have the following aspects. The film has at least two surface features made with a birefringent polymer. Each feature has a continuous cross section along a first in-plane direction (the groove direction) of the film. The cross section lies in the plane formed by a second in-plane direction (the cross-groove direction), orthogonal to the first and the normal direction to the film plane. Along any cross section, the collection of features possesses an average basal width and a distribution of basal widths varying about this average. In some embodiments, the basal width distribution among the features in the cross section is neither monotonically increasing nor monotonically decreasing.

The variable pitch of the features can include, for example, a random pitch, an aperiodic pitch, a quasi-aperiodic, or a combination of them. The pitch can be variable within first and second particular values and possibly random within those values. The surface opposite the structured surface in an article may be flat, smooth, rough, structured, or have other types of topography. Some embodiments can use, with the article or film, retarders, wave plates, multilayer optical films, IR filters, circular polarizers or all of these items together. Furthermore, an advantage of variable pitch microstructured articles lies in their ability to hide small defects in the film. This advantage can lead to considerable improvements in the manufacturing yield.

When the cross section varies for a given feature along the groove direction, the extent of that variation, e.g. in pitch, angle, height or depth, as well as the rate of change of that extent may play a role in the quality and function of the process and/or article. For example, the level of shape fidelity upon forming the structure or the quality of shape retention or even film integrity may vary. The effects of these factors on the suitability needs to be considered in the context of the desired use.

The relative position of the surface features determines the pattern of constructive and destructive interference for light passing through the film. In many instances it is desirable to minimize the effects of interference by randomly varying the relative positions of the surface features. The features can be contiguous, i.e. touching, across a specified length scale, e.g. 0.5 mm. The material in the features or on the back side of the land, when the materials are the same, can have a low level of relative birefringence. Along the first in-plane direction, the cross section of the collection of features can possess an average basal width and a distribution of basal widths varying about this average that remain essentially fixed. The collection of feature cross sections can vary along the first in-plane direction. The features can have similar shapes, possibly with different dimensions (e.g., right-triangle shapes of varying height but common apex angles). Alternatively, the features can have dissimilar shapes.

A process for forming the film having variable pitch microstructures can involve at least two steps. First, at least three surface features are formed consistent with the aspects identified above. Second, the film is stretched along the first in-plane direction of the film.

The process can alternatively involve the following additional aspects. The average basal width after stretching can be less than the initial basal width prior to stretching. The stretching can cause the polymer to become birefringent inside at least three surface features. The stretching process can be truly uniaxial and thereby maintain a high level of shape retention for the surface features and a low level of relative birefringence.

It is often advantageous to maintain the general shape of the surface features, e.g. apex angle and inclination of the sides relative to the film plane, along the cross section. For example, in a blur filter application, the slant of the inclined surface of the sawtooth and its nearly vertical side wall directly impact the relative divergence of the light in the two orthogonal states of polarization. The process of stretching reduces the dimensions of a typical surface feature. However, some forms of stretching (e.g., truly uniaxial stretching) essentially maintain the shape of individual surface features.

For example, a surface feature that is approximately a right triangle remains essentially a right triangle after stretching. Although linear dimensions of surface features change during uniaxial stretching, angular features of the structures are essentially retained. In certain embodiments, the film can be stretched, structured, and then stretched again.

Quasi-aperiodic features may be used generally in the method of the present invention. Such features may be formed on the surface of a polymeric cast film or web. The film may be stretched (drawn) along the groove direction (or average groove direction in the case of variable cross-sectioned features) with or without orientation resulting from the stretching. Alternatively, such features may be formed on a pre-oriented polymeric film.

Blur Filters

Figure 5:
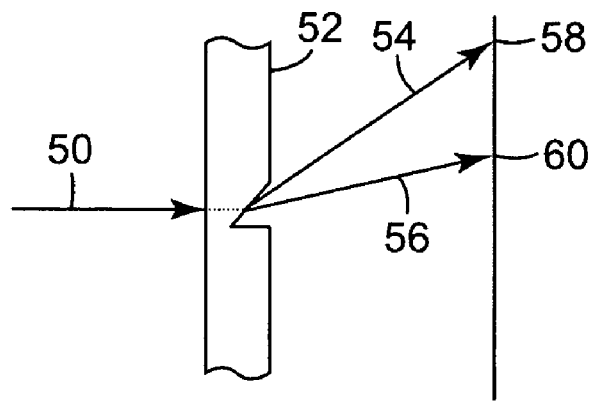
FIG. 5 is a diagram illustrating a structured article causing refraction of light for use as a blur filter.

The structured birefringent articles described above can be used to make blur filters to prevent or reduce artifacts, such as undesirable color moiré effects, in digital images. The blur filters can help reduce the effects of high frequency noise and can also possibly suppress pinpoint defects and suppress speckle occurring in some sensors. FIG. 5 is a diagram illustrating refraction of light for a blur filter. An incoming light signal 50 (for example, visible light, infrared light, or ultraviolet light) is refracted into two beams 54 and 56 by an article 52. The incoming light signal is typically unpolarized light. The two beams 54 and 56 become incident upon two locations 58 and 60.

Article 52 includes a structured surface having a particular geometric feature that causes the refraction of light signal 50 and those geometric features can include, for example, those described above and shown in FIGS. 3A-3W. The two beams 54 and 56, being divergent from one another, provide for blurring of incoming light signal 50 to filter it for use with an image sensor. The beams split by any article for use in a blur filter can have substantially the same intensities or any amount of different intensities from one another. In this example, the portion is structured such that, when the blur filter is placed within an optical path between a lens and an image sensor, the structured surface causes refraction of a light signal in the optical path into a plurality of light signals being at least partially spatially separated when incident upon the image sensor. The blur filters thus can provide for spatially separated divergent beams for use with an image sensor.

The amount of dispersion is based upon the material of the blur filter and wavelength of the incoming light. Some embodiments can use a birefringent dispersive medium, both indices being dispersive, possibly with low amount of dispersion. The amount of dispersion can be used as a design factor in some embodiments. The birefringent refractive medium can be combined with a diffractive medium. In some embodiments, it can be useful to minimize absorption and scattering in the spectrum of interest to improve transmission and more tightly control blurring. Also, it can be useful to use a low loss material for some embodiments.

The birefringent articles or bodies function as a polarizing beam splitter in thin sheet form. When used as blurring filters, they split light.

Figure 6:
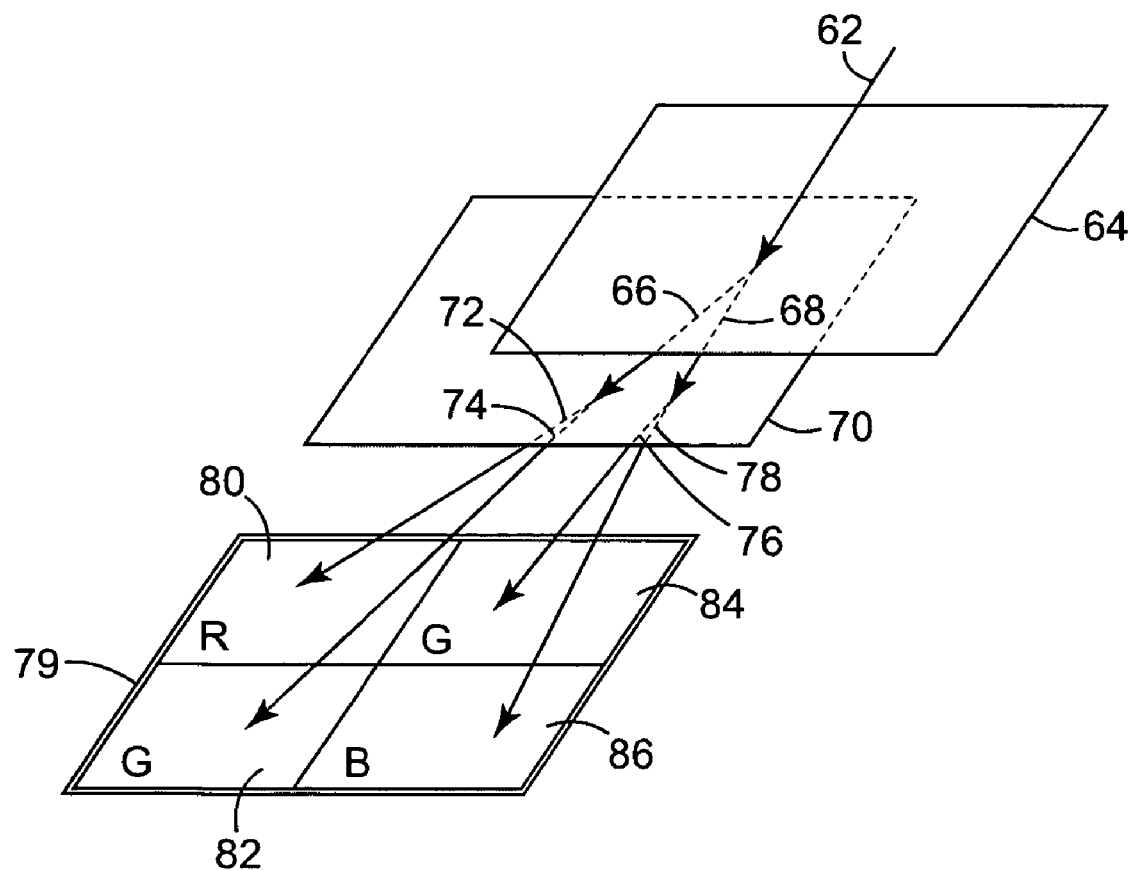
FIG. 6 is a diagram illustrating use of two structured articles to refract incoming light into four beams to be incident upon the sub-pixels in an image sensor.

FIG. 6 is a diagram illustrating use of two structured birefringent articles to refract incoming light into four beams to be incident upon sub-pixels in an image sensor. An incoming light signal 62 is refracted into two beams 66 and 68 by a first structured birefringent article 64. A second structured birefringent article 70 refracts each beam 66 and 68 into two beams, resulting in four beams 72, 74, 76, and 78, each corresponding with original incoming light signal 62. Articles 64 and 70 can include structured surfaces having geometric features for refracting the light signals such as those described above and shown in FIGS. 3A-3W.

The resulting four beams 72, 74, 76, and 78 become incident, respectively, upon the four sub-pixels 80, 82, 84, and 86 of a pixel 79 in an image sensor. The sub-pixels in an image sensor for full-color digital imagery typically include two sub-pixels for the color green and one each for the colors red and blue, all four sub-pixels together providing the primary colors. By splitting the incoming light signal 62 into the four beams 72, 74, 76, and 78, incident one each upon the four sub-pixels, the blur filter ensures that the image content in incoming light signal 62 impinges upon each sub-pixel so that the image sensor can more accurately represent the image information and thus reduce artifacts and other undesirable effects in the resulting digital image.

The split beams in FIG. 6 are shown for illustrative purposes only. The split beams need not be incident on neighboring pixels or sub-pixels, and they can be configured to impinge upon any pixels or sub-pixels in an image sensor. Although described as used with sensors having four sub-pixels for each pixel, the blur filters having one or more structured or non-structured birefringent articles can be used with image sensors having any number and configuration of sub-pixels within each pixel, and any configuration and arrangement of sensing portions, whether or not adjacent, cascaded, or in a combination of arrangements. The blur filters can also be used with image sensors that do not necessarily have defined pixels or sub-pixels; the image sensors may have other types of sensing portions. Also, the structured birefringent article or film can be tuned to split the incoming light signal based upon the sub-pixel configuration.

Figure 7:
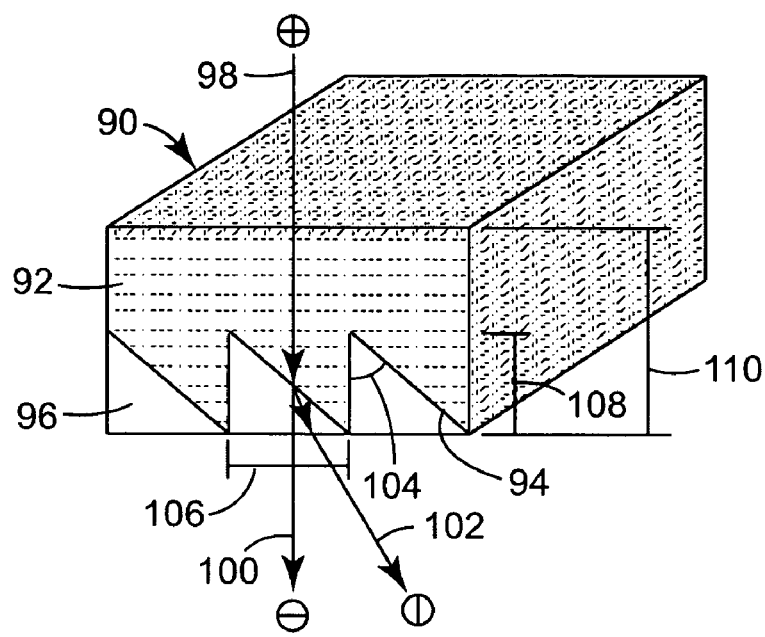
FIG. 7 is a detailed sectional view of a structured article for refracting a light signal in a blur filter.

FIG. 7 is a detailed sectional view of a structured birefringent article 90 for refracting a light signal, and article 90 can correspond with articles 64 and 70 in FIG. 6. Structured birefringent article 90 can have a body with a structured surface created according to the techniques described above and in Example 1. Other examples of bodies having structured surfaces are provided in U.S. Patent Provisional Application Ser. No. 60/639,033, entitled "Method of Making a Structured Surface Article," and filed Dec. 23, 2004, which is incorporated herein by reference as if fully set forth.

Structured birefringent article 90 includes a birefringent material 92 having a structured surface with a geometric feature 94, a sawtooth pattern in this example. In some embodiments, it may be advantageous to have flat facets on the sawtooth or equal angles of sawteeth to have tight control of degree of blur. Article 90 can also include an optional filling material 96 on the structured surface. Material 96 can be an optional index matching material, meaning that the index matching material and the material to which it is matching, have substantially the same index of refraction or close enough indices of refraction for a particular implementation along one principal direction. For example, the index matching material can match the refractive index n1 or substantially match n2 and n3, or be designed between n2 and 3 in the case where n2 and n3 are different. When the optional index matching material for material 96 is used, article 90 has substantially planar surfaces, which can provide an advantage in certain embodiments for mounting the blur filter within an optical package or for other reasons. The index matching material can include a layer with a controlled index of refraction. Index matching material need not necessarily be used in the blur filter; however, it may be useful for certain implementations. The optional filling material can also include other types of materials. For example, it can include an adhesive material with a complementary designed dispersion curve to reduce effects of dispersion.

An incoming light signal 98 to structured birefringent article 90 is refracted by geometric feature 94 into two beams 100 and 102. When the optional index matching material is used, beam 102 can be further refracted at the interface between index matching material and the adjacent air or another material. In this example and at normal incidence, the polarization of beam 100 vibrates across the orientation of the structured surface, and the polarization of beam 102 vibrates along the orientation of the structured surface. Also, in this example, article 90 is positioned with the structured surface having geometric feature 94 "down," away from the incoming light signal 98; however, it could be positioned or oriented in other ways as well. Moreover, since the refracted light exits blur filter (article 90) as divergent beams, the distance between the blur filter and an image sensor can be used to determine the amount of refraction (divergence) necessary, and hence the type and parameters of the geometric features, for the split beams to impinge upon the intended sub-pixels in the image sensor.

The surface opposite the structured surface in an article may be flat, smooth, rough, structured, or have other types of topography. In some embodiments, it may be advantageous to control the topography on the opposite surface to further fine-tune the refraction. Also, in some cases it is convenient to associate the first and second in-plane directions of the blur filter with principal in-plane directions of the dielectric tensor so that one in-plane direction is the direction of maximum refractive index and the other (orthogonal) direction is one of minimum refractive index for light passing normal through the plane.

Figure 8:
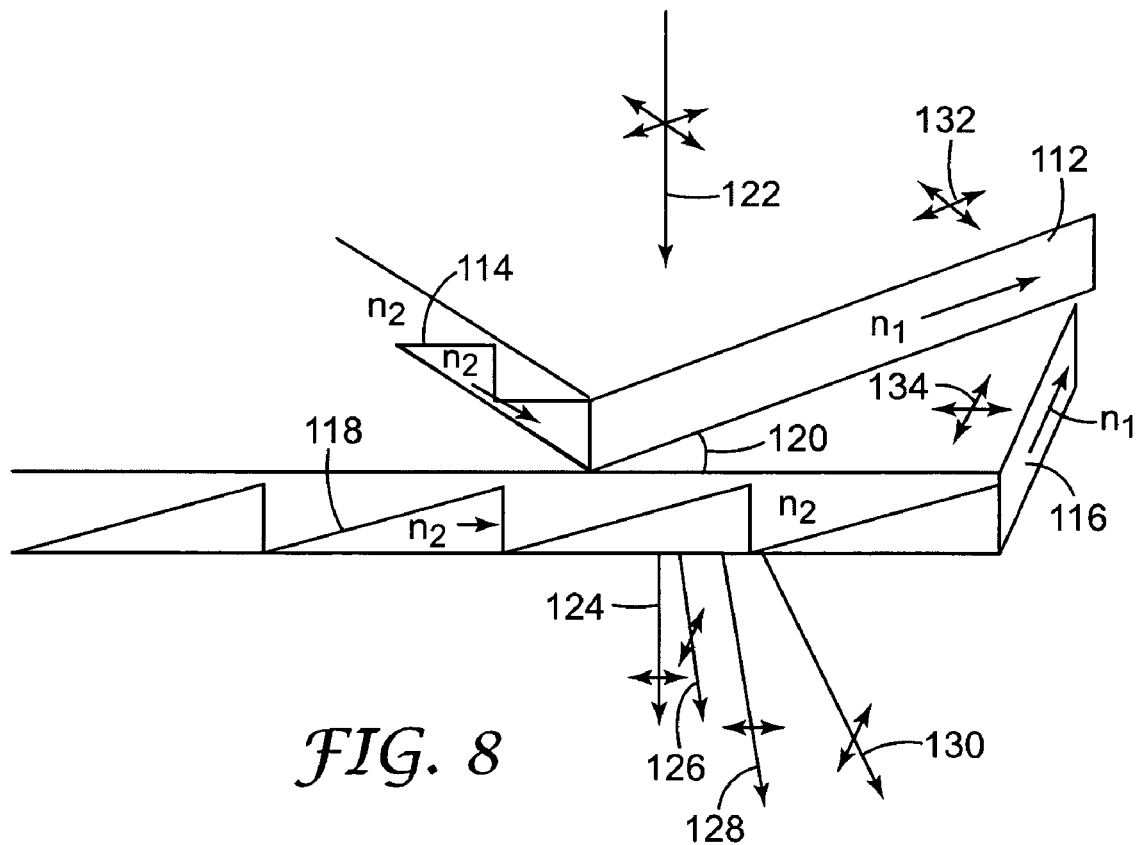
FIG. 8 is a detailed sectional view of a two structured articles for refracting a light signal into four beams in a blur filter.
Figure 9A:
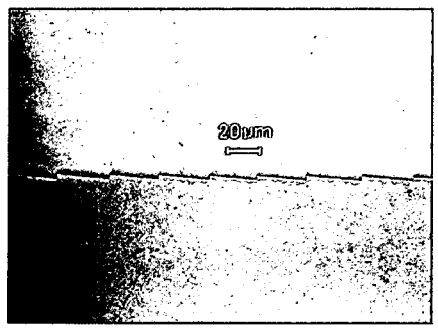
FIG. 9 is a diagram illustrating placement of a blur filter in an optical package for use with an image sensor.
Figure 9B:
Figure 9C:
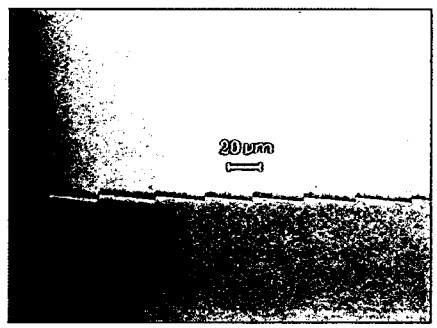
Figure 10A:
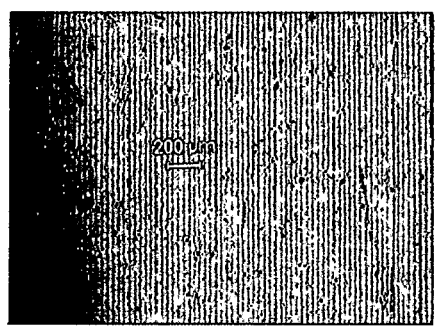
FIG. 10 is a diagram illustrating use of two structured articles to refract incoming light into four beams along with an IR filter and an antireflective coating.
Figure 10B:
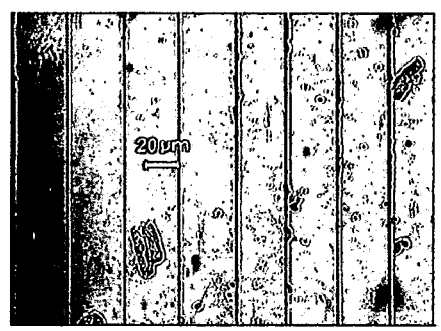

FIG. 8 is a detailed sectional view of two structured birefringent articles for refracting a light signal into four beams, as illustrated in FIG. 6, for use as a blur filter. Two films or articles provide for blurring in two dimensions, as shown in FIG. 8, while one film or article provides for blurring in one dimension, as shown in FIG. 7. To provide for splitting an incoming light signal into four beams, as shown in FIG. 8, one embodiment uses two structured birefringent articles having their geometric features oriented at a non-zero angle with respect to each other. A first structured birefringent article 112 has a "down facing" structured surface with geometric features 114, and a second structured birefringent article 116 has a "down facing" structured surface with geometric features 118.

The term "down facing" means that the structured surfaces are positioned away from the incoming light signal. The blur filters can also have one or more articles having an "up facing" structured surface, meaning that the structured surface is facing toward the incoming light. Moreover, they can use multiple articles, some having a "down facing" structured surface and others having an "up facing" structured surface. Whether the structured surface is "up facing" or "down facing" may in some implementations be determined based upon an amount of reflection of the incoming light signal.

In this example, both geometric features 114 and 118 are a sawtooth pattern with substantially the same parameters, angle, pitch, and height, as explained with respect to FIG. 7. A sawtooth pattern for a structured surface may provide particular advantages, providing for only two diverging beams minus minor or negligible leakage on the sidewall of the sawtooth pattern, which allows for tighter control of the diverging beams. A sawtooth pattern can include an inclined surface with a sidewall nearly perpendicular to the base film within 15° and more typically 5°. Some embodiments can use a sawtooth pattern with a backcut (see FIG. 3S), which may eliminate or reduce the amount of leakage.

Figure 3Q:
Figure 3R:
Figure 3S:
Figure 3T:
Figure 3U:
Figure 3V:
Figure 3W:

The two structured birefringent articles could alternatively include different geometric features such as, for example, one having sawtooth geometric features and the other having sinusoidal geometric features (see FIGS. 2B and 3Q). Also, in this example, articles 112 and 116 are positioned plane parallel to each other. Article 116 is also oriented such that its geometric features 118 are at a 45° angle 120 to geometric features 114 of article 112. With this positioning, articles 112 and 116 refract an incoming light signal 122 into four beams 124, 126, 128 and 130, when light signal 122 is received orthogonal to in-plane axes 132 and 134 of articles 112 and 116, respectively. The four beams 124, 126, 128 and 130, when articles 112 and 116 are in use as a blur filter, would preferably each be incident upon different sub-pixels within the pixels of an image sensor. Other orientations may be used in accordance with design considerations, including the relative positioning and power balances among the beams.

When used as a blur filter, articles 112 and 116 can optionally include an index matching material on their structured surfaces. Also, articles 112 and 116 can optionally include an index matching fluid between them, which can improve performance of the filter by, for example, reducing reflections between articles 112 and 116. Also, articles 112 and 116 can optionally be adhered to one another (for example with an epoxy or acrylic material) for mounting as a blur filter.

Figure 9:
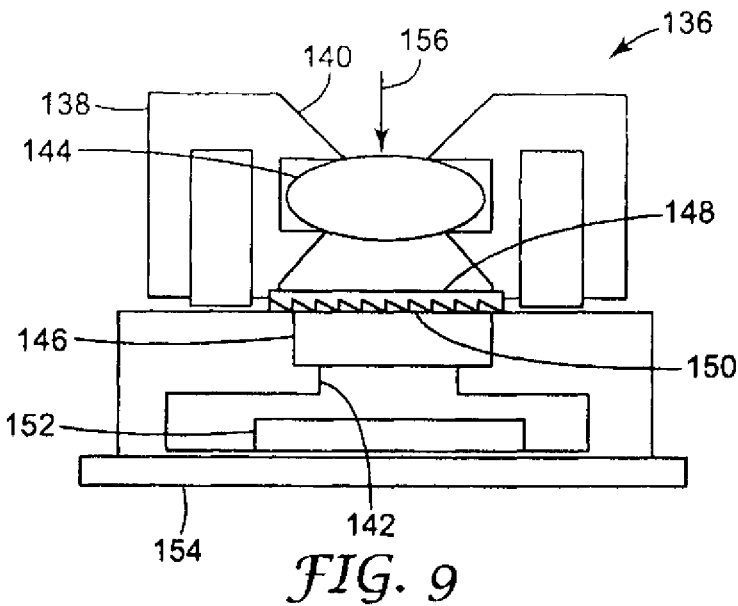

FIG. 9 is a diagram illustrating placement of a blur filter in an optical package 136 for use with an image sensor. In this example, optical package 136 includes a housing 138 having an aperture 140 for receiving an incoming light signal 156 and an aperture 142 for placement over an image sensor 152 such as, for example, complementary metal oxide semiconductor (CMOS), charge coupled device (CCD), infrared, or ultraviolet sensors. Image sensor 152 is typically mounted on a printed circuit board (PCB) 154 and electrically connected with circuitry on PCB 154. A lens 144 in housing 138 focuses incoming light from aperture 140 onto image sensor 152. Image sensor 152 converts light into corresponding electrical signals, which are transmitted to circuitry on PCB 154 for additional processing such as storage or display on a display device as a digital photograph. The term "image sensor" includes any device capable of converting light signals into a corresponding electrical signal or another type of energy signal.

In this example, a blur filter 148 is mounted in housing 138 between lens 144 and image sensor 152. Blur filter 148 can include two articles, for example, having structured surfaces with geometries to be oriented with respect to one another and to be positioned with in-plane axes orthogonal to incoming light signal 156, as explained with respect to FIG. 8. Blur filter 148 can include an optional index matching fluid 150 and a transparent sealing plate 146, for example glass or plexiglass, to seal the index matching fluid against the structured surface of the blur filter 148. Blur filter 148 can be adhered to sealing plate 146 using, for example, a PSA (pressure-sensitive adhesive), UV-cured (ultraviolet), or light-cured system. In this example, blur filter 148 is mounted with its structured surfaces "down," away from the incoming light signal 156. Also, blur filter 148 is mounted with its in-plane axes orthogonal to an optical path of light signal 156 as focused by lens 144 onto image sensor 152 (see FIG. 8).

The geometric features in blur filter 148 can be varied or adjusted based upon the distance between blur filter 148 and image sensor 152. Since the refracted light exits blur filter 148 as divergent beams, the distance between blur filter 148 and image sensor 152 can be used to determine the amount of refraction (divergence) necessary, and hence the type and parameters of the geometric features, for the split beams to impinge upon the intended sub-pixels in the image sensor. The divergence can be used as a design parameter based upon the distance between the blur filter and image sensor along with the divergence angle. Alternatively, the distance between the blur filter and the image sensor can be used as a design parameter. Other design parameters can include the characterization of the incoming light from the lens (such as the f-number), the thickness of the blur filter, indices of refraction, matching layers, refraction angles. Optical modeling techniques, for example, can be used to obtain parameters of an optimum or preferred design to obtain a desired amount of blur for a particular implementation.

Figure 10:
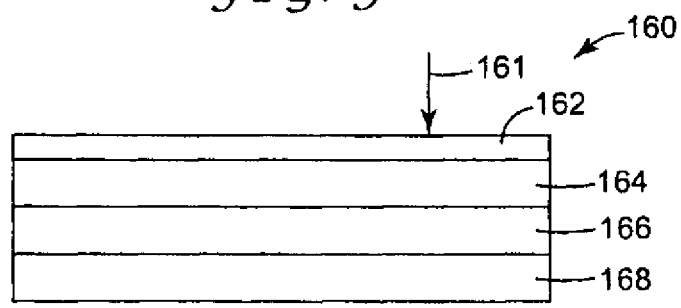
Figure 11A:
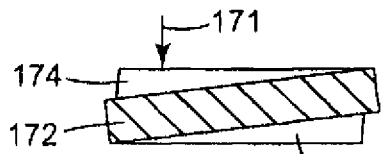
Figure 11B:
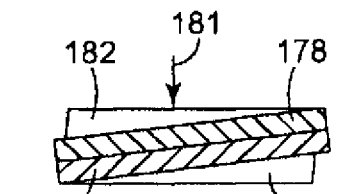
Figure 11C:
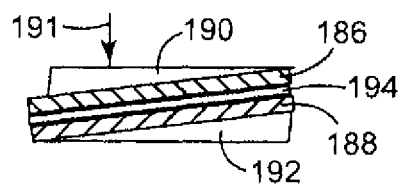
Figure 11D:
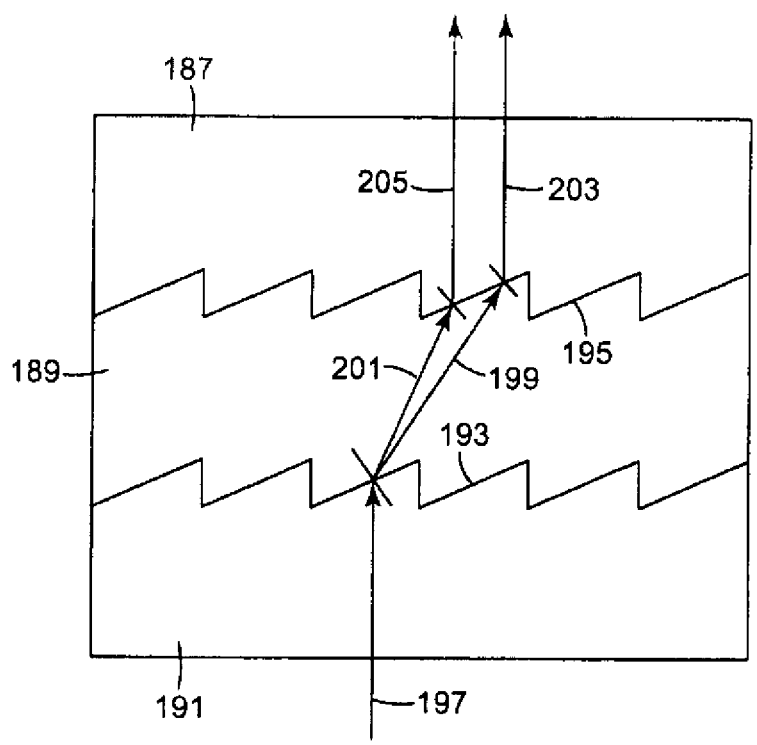

FIG. 10 is a diagram illustrating a blur filter 160 in an alternate embodiment using two structured birefringent articles to refract incoming light into four beams along with additional coatings. Blur filter 160 includes a first structured birefringent article 164 and a second structured birefringent article 168, together providing for the refraction of an incoming light signal 161 into four beams. Articles 164 and 168 can have structured surfaces with geometries to be oriented with respect to one another and to be positioned with in-plane axes orthogonal to incoming light signal 161, as explained with respect to FIG. 8.

In blur filter 160, articles 164 and 168 are separated by a film 166, which can include a multilayer optical film. Multilayer optical films can be made to include an IR (infrared) filter depending upon the layering of the stack in the film. The IR filter can function as a retarder plate. Other types of IR filters can alternatively be used in the blur filter. Some embodiments can use, between the articles, retarders, wave plates, multilayer optical films, IR filters, circular polarizers or all of these items together.

A film or plate 166 can be particularly useful as a retarder plate when film 166 has in-plane birefringence, i.e., two in-plane axes of different refractive indices. The orientation of these axes with respect to film 166 can be used to vary the power distribution along the beams exiting film 168. In particular, a quarter wave plate may be useful. In blur filter 160, article 164 refracts incoming light signal 161 into two beams, film 166 can provide an IR mirror to reflect IR light, and article 168 refracts the two filtered beams into four beams for transmission incident upon sub-pixels within pixels of an image sensor. Article 164 can also include an anti-reflective coating or film 162 to reduce or eliminate reflections of incoming light signal 161 and thus provide more image information in the light signal 161 to an image sensor.

Figure 11A:
FIGS. 11A-11C are diagrams of an alternative embodiment including a tilted plate article refracting a light signal for use a blur filter.
Figure 11B:
Figure 11C:
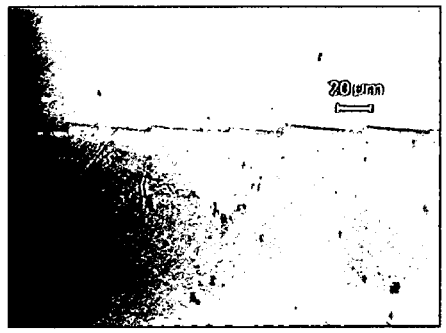
Figure 12A:
FIG. 12 is a diagram illustrating placement of a tilted plate blur filter in an optical package for use with an image sensor.
Figure 12B:

FIGS. 11A-11C are diagrams of an alternative embodiment including a tilted plate birefringent article (optionally structured) refracting a light signal for use as a blur filter. Instead of using an article with a structured surface having geometric features, and in-plane axes orthogonal to an incoming light signal, the optionally structured birefringent article can be oriented with at least one in-plane axis at a non-orthogonal angle to the incoming light signal. FIG. 11A illustrates a tilted plate blur filter having a birefringent article 172 between optional material 174 and 176, such as an index matching material, for example. Article 172 is tilted with respect to an incoming light signal 171, meaning that a third axis of article 172 orthogonal to the in-plane axes is oriented at a non-zero angle to incoming light signal 171.

FIG. 11B illustrates a second tilted plate blur filter using first and second optionally structured birefringent articles 178 and 180 positioned between index matching material 182 and 184. Articles 178 and 180 are both positioned tilted with respect to an incoming light signal 181, meaning that their third axes are oriented at a non-zero angle to the incoming light signal 181.

FIG. 11C illustrates a third tilted plate blur filter using first and second optionally structured birefringent articles 186 and 188 positioned between index matching material 190 and 192. Articles 186 and 188 are also separated by a material 194, possibly being an index matching material providing for various types of filters, for example an IR filter or UV absorber. Articles 186 and 188 are both positioned tilted with respect to an incoming light signal 191, meaning that their third axes are oriented at a non-zero angle to incoming light signal 191.

The blur filters shown in FIGS. 11A-11C can have non-structured surfaces in that being tilted in the optical path itself provides for refraction. They can also have structured surfaces for other amounts of refraction. The blur filters shown in FIGS. 11B and 11C can have structured surfaces with geometric features to be oriented with respect to one another as explained with respect to FIG. 8, except that together they are tilted (at a non-zero angle) with respect to the incoming light signal. The blur filter, whether or not using a tilted plate, can have the structured surface oriented at a non-zero angle with respect to a first plane of the first and second surfaces.

In the tilted plate blur filters shown in FIGS. 11A-11C, material 174 and 176, along with material 182, 184, 190, and 192, is optional and can be used in certain embodiments to affect how the light beams exit the blur filter. Material 174 and 176 can provide for the following: they can be used as wedge-shaped shims; they can reduce reflections at the surface of article 172; and they can provide for parallel exiting beams. Neither material 174 or 176 need match the refractive index of article 172. If material 174 and 176 have the same index of refraction (and are isotropic) and match the index of refraction of article 172, then a first beam will traverse straight through the blur filter and the second (split beam) will exit parallel and separated from the first beam. If material 174 and 176 have the same index of refraction (and are isotropic) and do not match the index of refraction of article 172, then both beams will exit parallel and separated from each other and both will be "walked off" from the incoming light (not passing straight through). If material 174 and 176 have different indices of refraction, the exiting beams will be divergent. If only one of material 174 or 176 is used, the exiting beams will be divergent whether or not the material 174 or 176 has the same index of refraction as article 172.

Figure 11D:
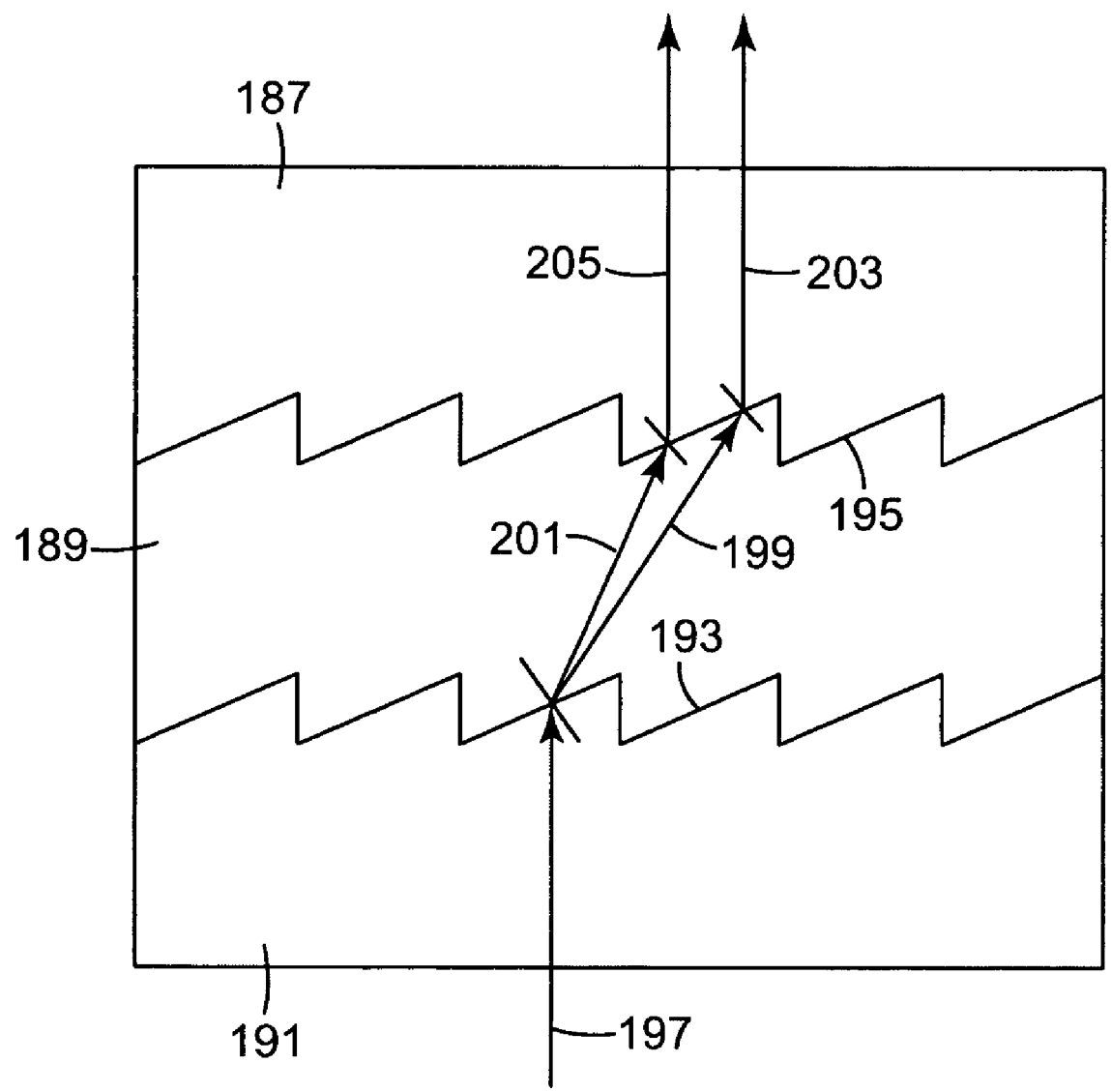
FIG. 11D is a diagram of two microstructured films used to generate parallel exit beams.

FIG. 11D illustrates a combination of structures providing for substantially parallel split beams. A birefringent structured article 191 has geometric features 193, and a birefringent structured article 187 has geometric features 195. A layer 189, such as an index matching or other type of material, is placed between birefringent structured articles 187 and 191. Alternatively, layer 189 can be a different material or even an air gap with edge spacers separating the films. An incoming light signal 197 is refracted by geometric features 193 into divergent beams 199 and 201, which are then refracted by geometric features 195 into two substantially parallel beams 203 and 205. Use of parallel split beams may be useful in situations where, for example, the distance between the blur filter and image sensor may be varied. Use of divergent split beams, on the other hand, may be useful in situations where, for example, the distance between the blur filter and image sensor is a design factor.

Figure 12:
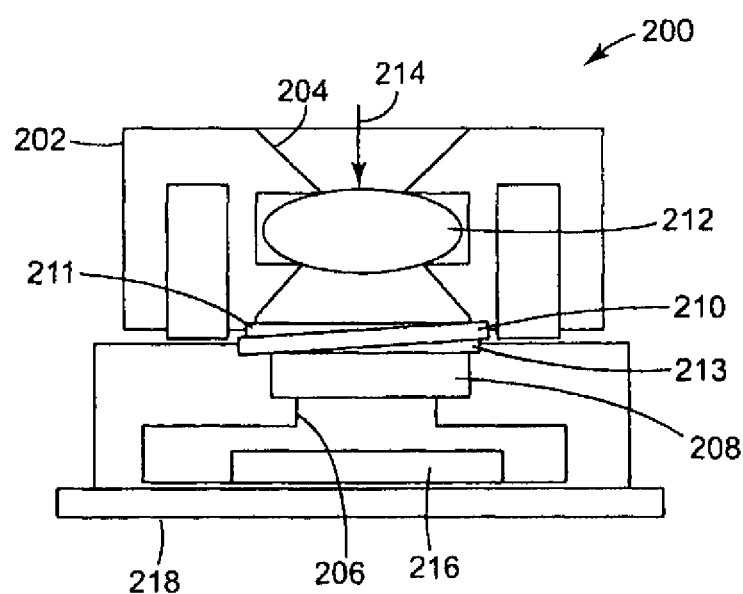

FIG. 12 is a diagram illustrating placement of a tilted plate blur filter in an optical package 200 for use with an image sensor. Optical package 200, in this example, includes a housing 202 having an aperture 204 for receiving an incoming light signal 214 and an aperture 206 for placement over an image sensor 216 such as, for example, a CMOS or CCD sensor. Image sensor 216 is typically mounted on a PCB 218 and electrically connected with circuitry on PCB 218. A lens 212 in housing 202 focuses incoming light from aperture 204 onto image sensor 216. Image sensor 216 converts light into corresponding electrical signals, which are transmitted to circuitry on PCB 218 for additional processing such as storage or display on a display device as a digital photograph.

In this example, a tilted blur filter 210 is mounted in housing 202 between lens 212 and image sensor 216. Blur filter 210 can have any of the configurations as shown in FIGS. 11A-11C, for example. Blur filter 210 can include an optional transparent sealing plate 208, for example glass or plexiglass. In this example, blur filter 210 is mounted with its structured surfaces "down," away from the incoming light signal 214. Blur filter 210 can be adhered to sealing plate 208 using, for example, a PSA, UV-cured, or light-cured system. Also, blur filter 210 is mounted with the structured birefringent article at a non-orthogonal angle to an optical path of light signal 214 as focused by lens 212 onto image sensor 216.

Blur filter 210 can include an optional material 211 and 213, as shown in FIGS. 11A-11C. When an index matching material is used for optional material 211 and 213, The index matching material can be used to create a tilted plate blur filter with planar surfaces at an orthogonal angle to the incoming light signal, which can facilitate ease of mounting the blur filter within an optical package. The geometric features in a blur filter 210 can be varied or adjusted based upon the distance between blur filter 210 and image sensor 216.

The optical packages shown in FIGS. 9 and 12 can have additional structure involving f-numbers. Photographers set their exposure using a combination of shutter speeds and f-numbers to obtain the correct amount of light on the film. The shutter speed regulates how long the film is exposed to light coming through the lens. The f-number regulates how much light is allowed through the lens by varying the area of the hole the light comes through. For any given film speed and lighting combination there is one correct amount of light to properly expose the film. This amount of light can be achieved with many different combinations of f-numbers and shutter speeds. The optical path has a cone, identified by the f-numbers, and the optical image has a cone angle, which may determine positioning of the blur filter with respect to an image sensor.

Blur filters consistent with the present invention can use structured birefringent articles, non-structured birefringent articles, structured birefringent articles tilted in the optical path, non-structured birefringent articles tilted in the optical path, or a combination of these types of articles. Those articles, or combinations of them, can be used to produce divergent or parallel exit beams. The birefringent structured articles, when used, can have adjacent geometric features to provide substantially complete blurring of the incoming light signal, or they can have flat portions among the geometric features to provide certain amounts of non-blurring in those portions. For example, in the case of a system with two filters for two-dimensional blurring, a flat section on the first filter closest to the source provides an unpolarized amount of leakage, which can then be split by the second filter in different directions. This configuration can eliminate the need for a retarder plate or can improve the relative positioning and power balancing among the beams by using an orientation closer to or at 90°. The size of the flat portions and the sawteeth, in this example, may be designed for the amount of blur needed or desired for a particular pixel size.

The birefringent articles can optionally have coatings providing for filtering, for example. Also, they can have matching indices of refraction among different axes or different indices of refraction. The blur filters using birefringent articles, as described above, can be used or combined with other components such as, for example, a quartz plate. One particularly useful embodiment has a birefringent material, either the structured article or tilted plate, that has uniaxial orientation or nearly uniaxial orientation. For example, one measure of uniaxial orientation is their relative birefringence, for example less than 0.3 or more preferably less than 0.1.

Figure 13:
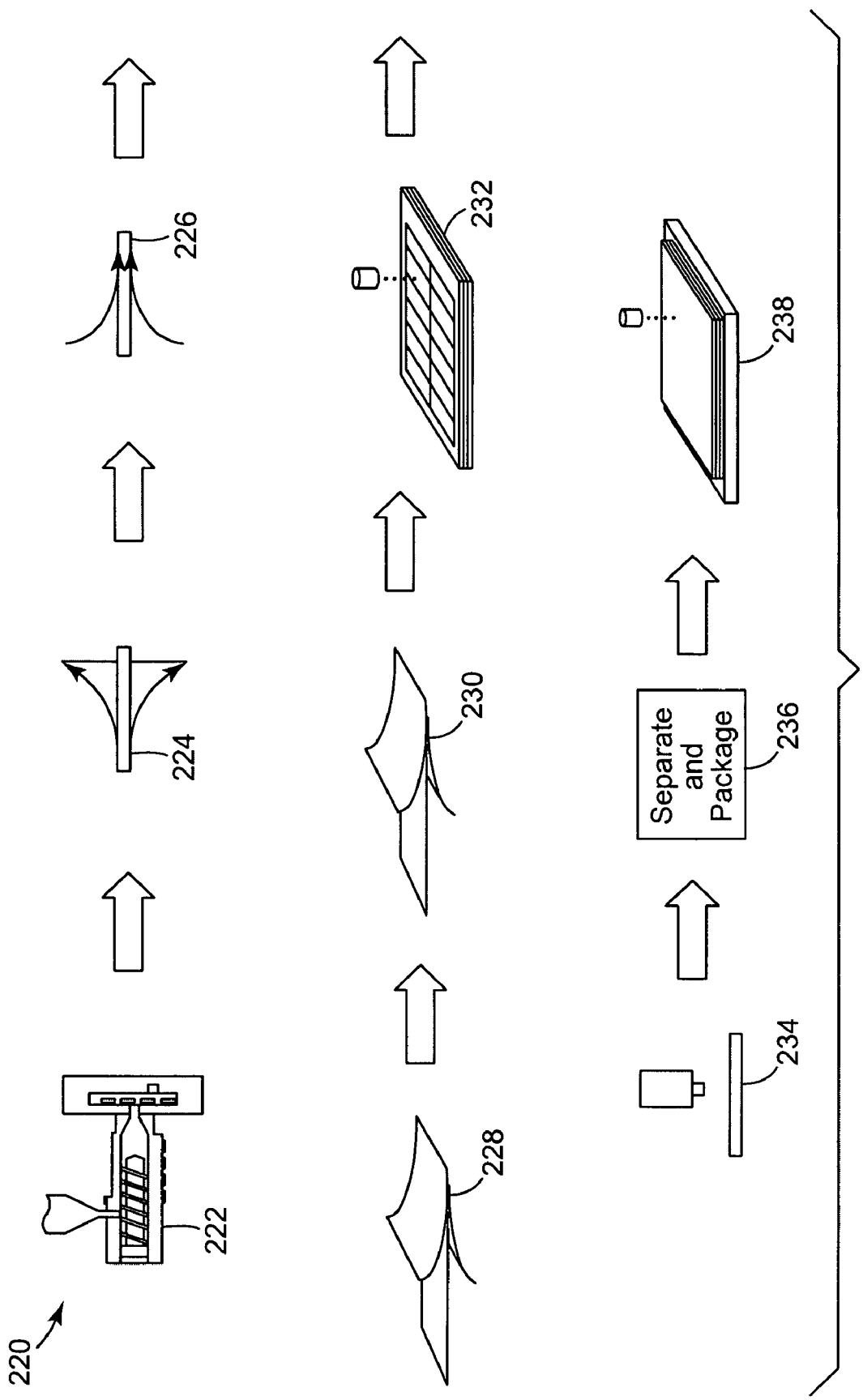
FIG. 13 is a diagram illustrating an example of a manufacturing process to produce a structured article for use as a blur filter.

FIG. 13 is a diagram illustrating an example of a manufacturing process 220 to produce a structured birefringent article blur filter such as those described with respect to FIGS. 6-10. In this example, process 220 may include the following steps: extrude film for the structured birefringent article (step 222); uniaxially orient the film (step 224); apply adhesive to the film (step 226); laminate the cross structure, the second structured film, onto the first film (step 228); laminate the two films to a glass substrate (step 230); convert and section the laminated films into individual portions, for example die cut, laser cut, rotary cut, or punch (step 232); inspect and mark the separated portions (step 234); package the individual blur filters (step 236); and install the blur filters into camera packages (step 238).

Figure 14:
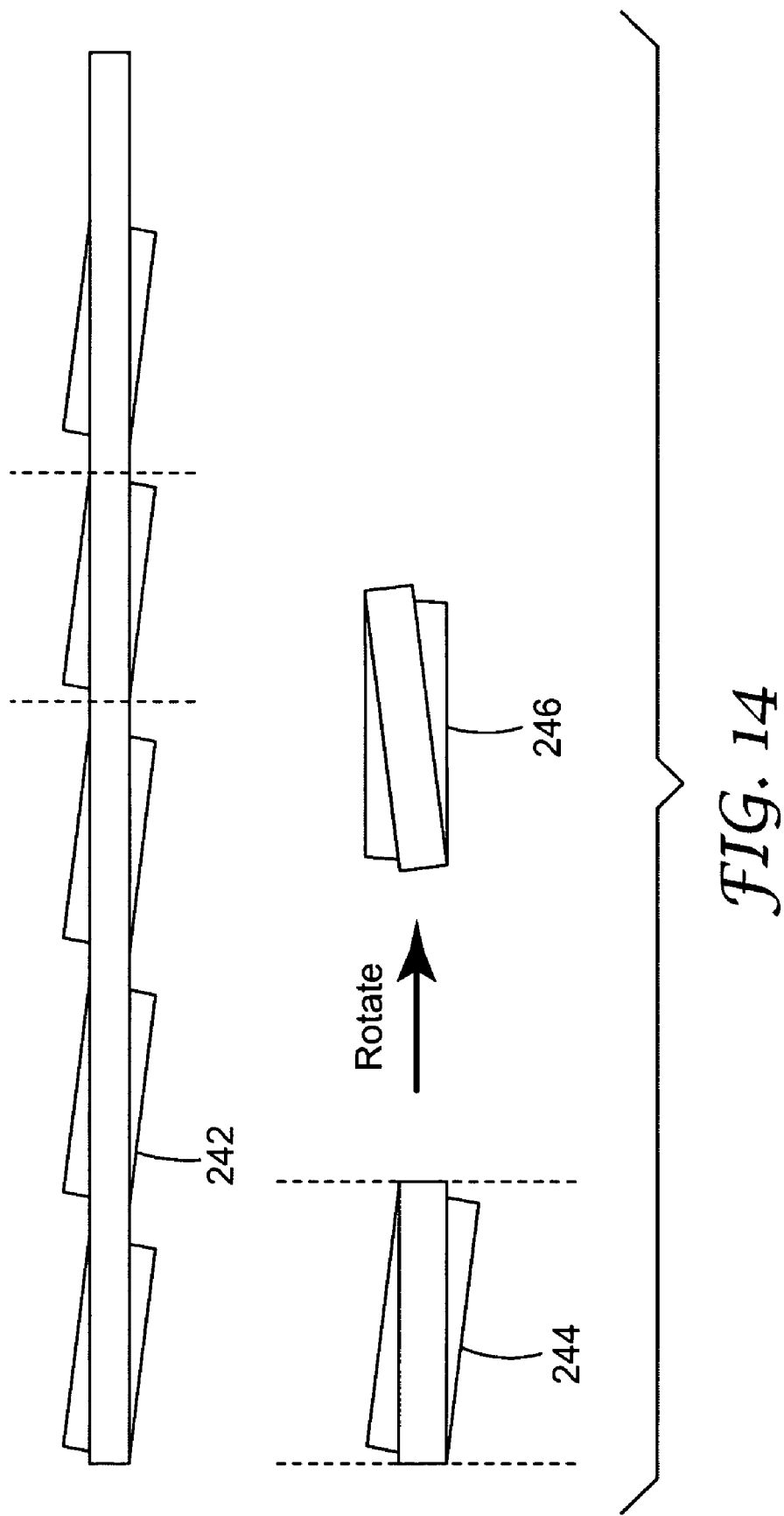
FIG. 14 is a diagram illustrating an example of a manufacturing process to produce a tilted plate blur filter.

FIG. 14 is a diagram illustrating an example of additional steps of manufacturing process 220 to produce a tilted plate blur filter. After step 228 to produce the two oriented and adhered films, an index matching material is applied in a pattern along both surfaces of the adhered films (step 242); portions are sectioned into individual blur filters (step 244); and the individual blur filters are rotated (step 246) to be laminated to glass in step 230 of process 200. Since the tilted blur filters are already sectioned, they can be inspected and marked (step 234), packaged (step 236), and installed into camera packages (step 238).

The processes shown in FIGS. 13 and 14 are provided for exemplary purposes only. Other processes to make blur filters may include more steps, fewer steps, different steps, or the steps shown performed in a different order. They can possibly include laminating, adhering (possibly on the blur filter edges), or otherwise connecting the blur filter to another article such as with pins or clips. Some processes may involve applying various types of coatings to the articles or using protective sheets during the process. In addition, each of the exemplary steps may be implemented in various ways, when used. A basic process may involve, for example, starting with a birefringent structured film, and inspecting and packaging the film for use as a blur filter.

Variable Pitch Blur Filters

Diffraction has been observed in blur filters using birefringent structures. Diffraction can play a significant and is undesirable role in the blur filter function, as the diffraction can produce anomalous variations in intensity in a resulting image and thus degrade its appearance. Therefore, the present invention provides a way to minimize diffractive artifacts arising from microreplicated structures by using a variable pitch in the exemplary blur filters described above, as opposed to a substantially regular pitch with well-defined structures. In comparison to other methods, this approach is advantageous because it allows greater design flexibility and allows the use of shallower grooves.

The variable pitch of the features in the blur filter can include, for example, a random pitch, an aperiodic pitch, a quasi-aperiodic pitch, or a combination of them. The features may comprise a birefringent or an isotopic material. In one embodiment, a blur filter can be formed using a combination of sawtooth-like features combined with intervening flats or with prismatic features with two slanted surfaces oppositely inclined to the horizontal. When the features are optically isotropic, the angle between the two types of surfaces (slanted/oppositely slanted or slanted/flat) controls the angular deviation of blur. The slanted surfaces in these cases are usually nearly horizontal to achieve a desired low level of blurring. Because the blur is desired over the order of a few pixels and because the filter may be placed near the imaging plane, it can be, but need not be, desirable to have the pitch size of these structures on the order of the size of the pixels. In these cases, the pitch may be varied among both inclined or inclined and flat sections. Moreover, the cross-sections may be held constant or varied along the grooves. In such a manner, the effective land between the structure and the opposing side of the film may effectively vary in accord with the previous discussion. Also, the blur filter can be fine tuned based upon a particular sensor design to cause effective blurring but not too much blur.

In some cases, the process of stretching the film after the structures are formed allows the tailoring of the film to various customer needs and system designs within the constraint of a single structure formation step, for example using a single common roll stock as formed by a single common tool during a single extrusion process. In such case, it may be possible to stretch the film in order to adjust the structure size to a particular sensor pixel pitch or to a given distance in the optical train. The stretching may be accomplished without orientation in some cases or with orientation in others. It may also be possible to stretch already drawn materials still further in this manner in an additional post-processing step. Combining a drawing step and an additional heat-setting step may also allow maintenance of a final birefringence for various levels of post-drawing. Such a this process typically also involves controlling both temperature and drawing ratio when stretching the film.

Examples of variable pitch microstructured films for use as a blur filter are shown in FIGS. 15, 16A, 16B, 17A, 17B, 18A, and 18B. In these Figures, the land z and amplitude in the side views, and the variations along the groove direction and gradient in the top views, are not to scale. (An example of a film having features with variable angles for use as a blur filter is shown in FIG. 2E.)

Figure 15:
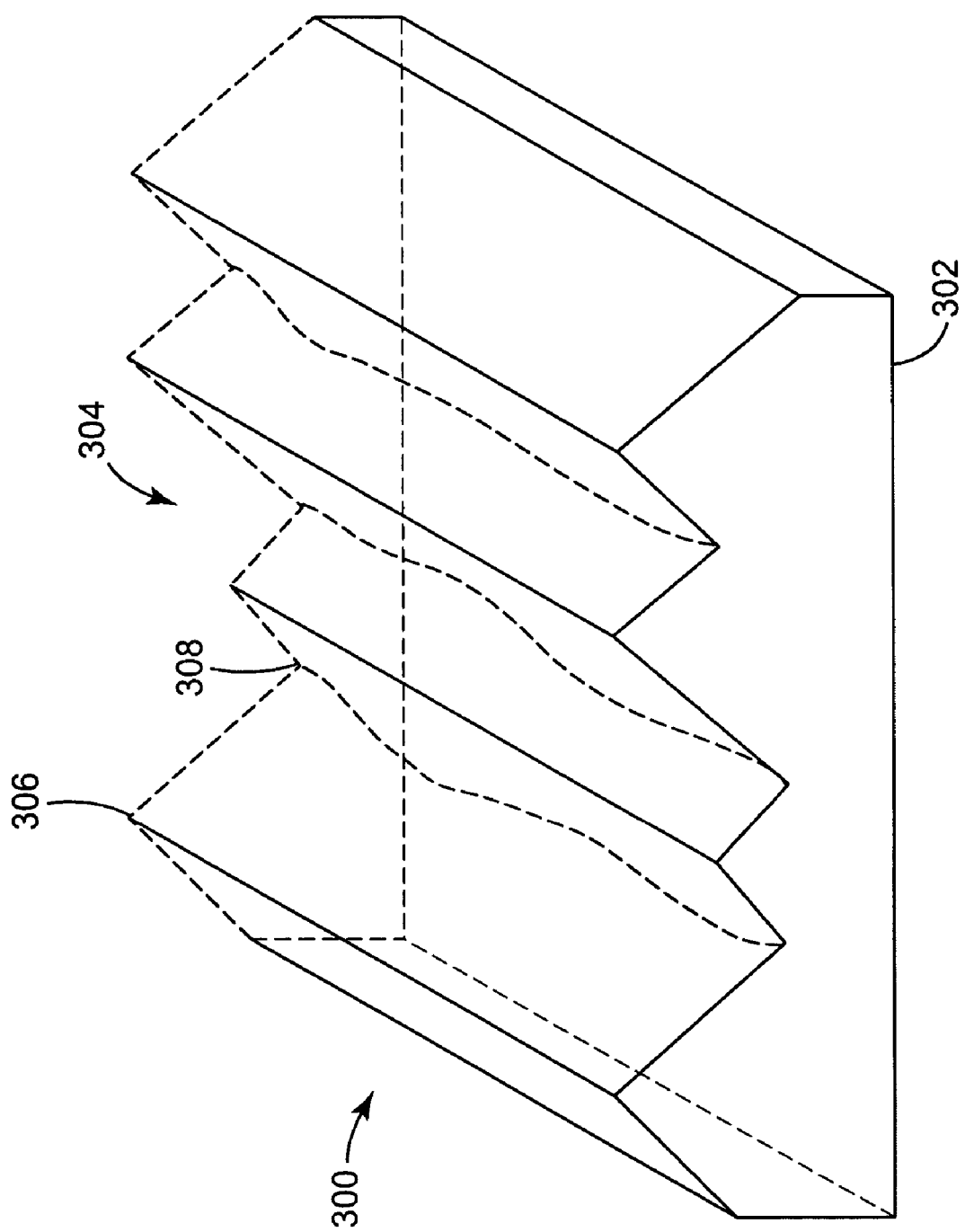
FIG. 15 is a perspective view of a variable pitch microstructured birefringent film.

FIG. 15 is a perspective view of a section of a variable pitch microstructured birefringent film with a fixed PS. Film 300 has a structured surface 304 and an opposing surface 302. Unlike the films with periodic structures (as in FIG. 2A or 2B, for example), the peaks (e.g, peak 306) of film 300 do not form a straight line parallel to the first in-plane axis. Instead, the heights of the peaks of the prisms shown in FIG. 15 are allowed to vary continuously along their lengths. Similarly, the depths of the valleys (e.g., valley 308) are also allowed to vary continuously.

Figure 16A:
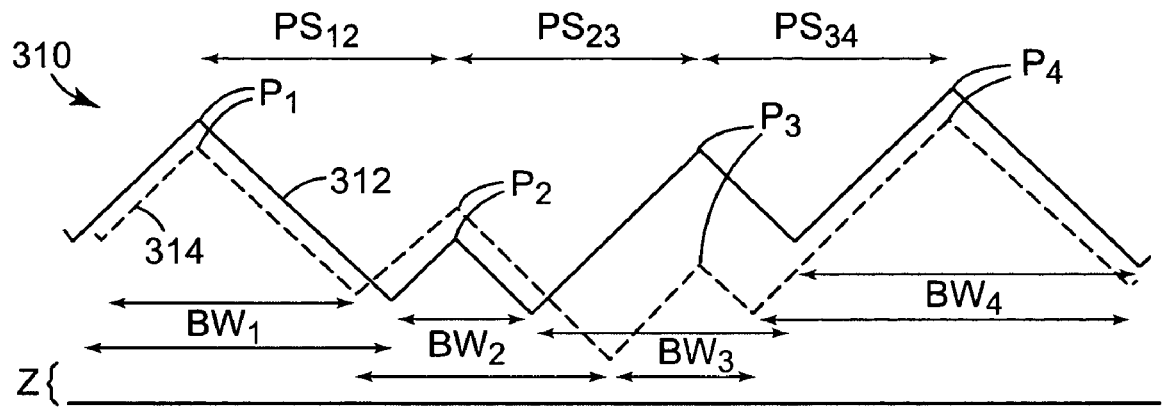
FIGS. 16A and 16B are side and top views, respectively, of a variable pitch microstructured birefringent film having a constant PS and a variable BW.
Figure 16B:
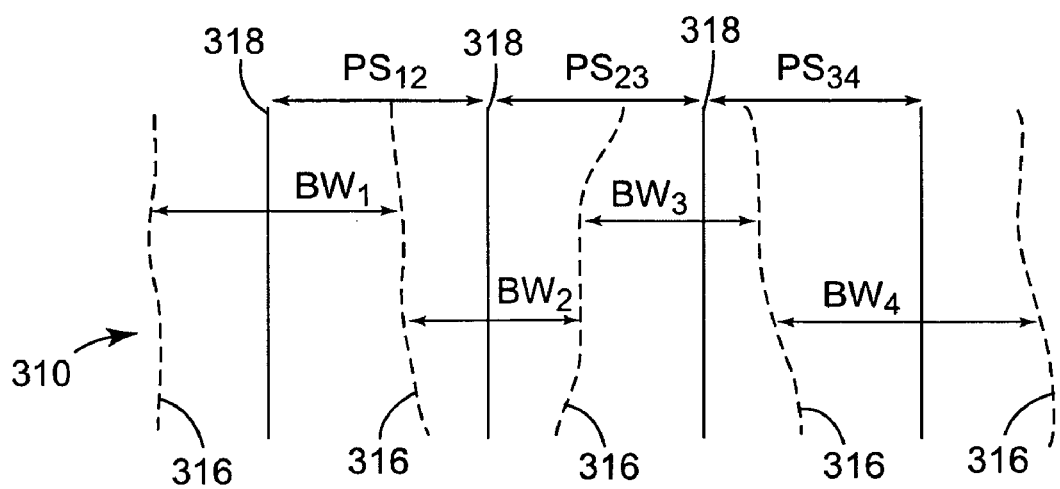

FIGS. 16A and 16B are side and top views, respectively, of a section of a variable pitch microstructured birefringent film 310 having a constant PS and a variable BW. In FIG. 16A, the side view of film 310 is shown with cross sections 312 and 314 at two locations along the groove direction. Film 310 has a constant PS, as shown by the substantially same distances represented by $PS_{12}$, $PS_{23}$, and $PS_{34}$, where $PS_{xy}$ is the distance between peaks $P_x$ and $P_y$. Also, film 310 has a variable BW, as shown by the different distances represented by $BW_1$, $BW_2$, and $BW_3$, where $BW_x$ is the distance between the valleys of peak $P_x$. In FIG. 16B, the top view of film 310 illustrates the projected peak contours 318 and valley contours 316.

Figure 17A:
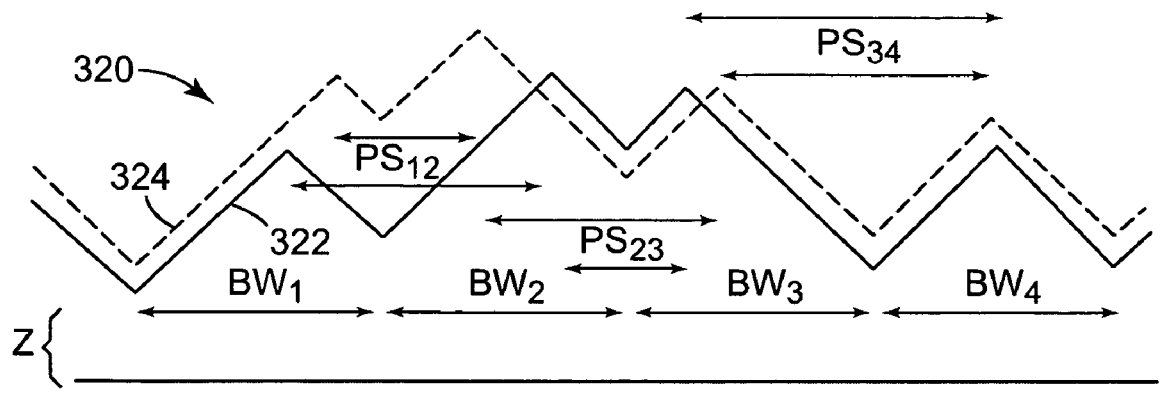
FIGS. 17A and 17B are side and top views, respectively, of a variable pitch microstructured birefringent film having a variable PS and a constant BW.
Figure 17B:
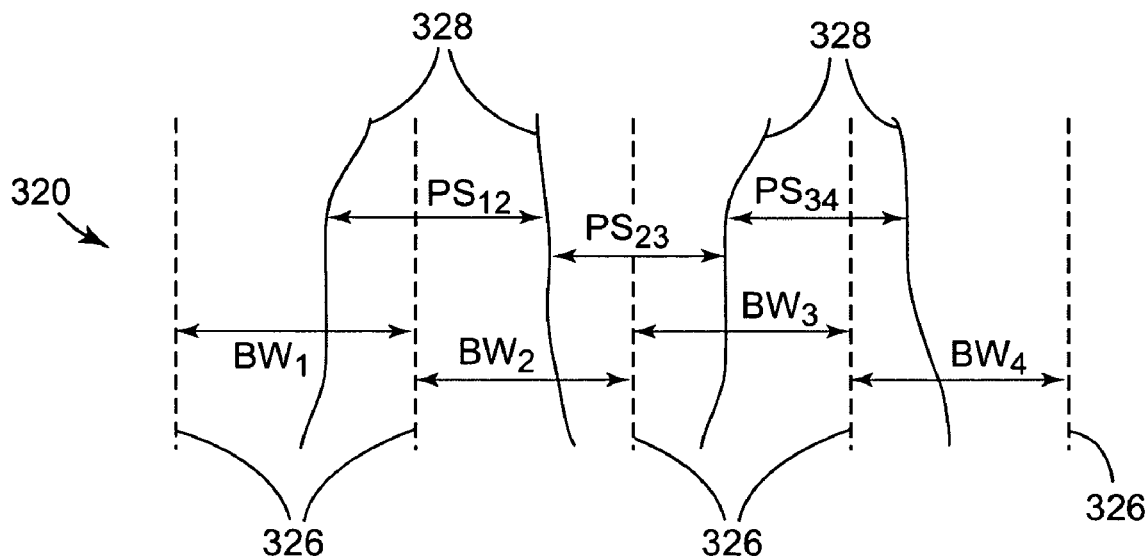

FIGS. 17A and 17B are side and top views, respectively, of a section of a variable pitch microstructured birefringent film 320 having a variable PS and a constant BW. In FIG. 17A, the side view of film 320 is shown with cross sections 322 and 324 at two locations along the groove direction. Film 320 has a variable PS, as shown by the different distances represented by $PS_{12}$, $PS_{23}$, and $PS_{34}$, and it has a constant BW, as shown by the substantially same distances represented by $BW_1$, $BW_2$, and $BW_3$. In FIG. 17B, the top view of film 320 illustrates the projected peak contours 328 and valley contours 326.

Figure 18A:
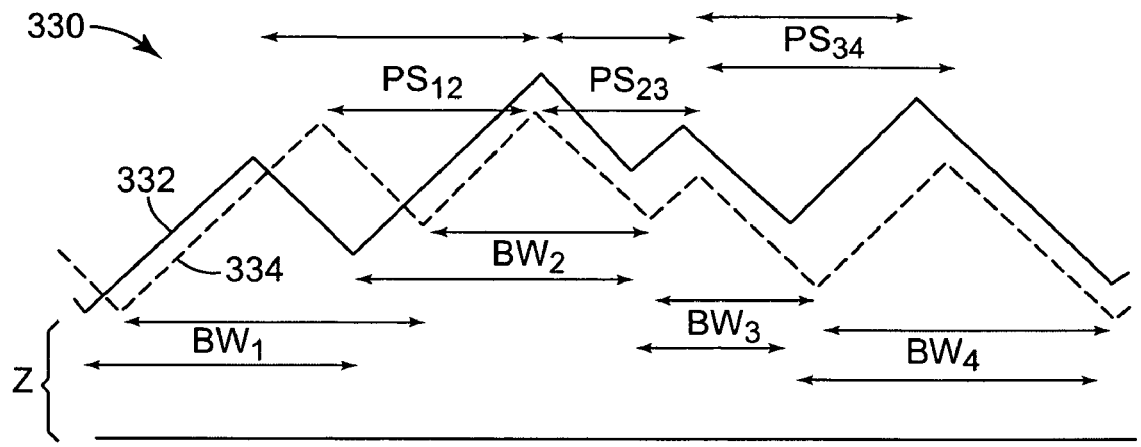
FIGS. 18A and 18B are side and top views, respectively, of a variable pitch microstructured birefringent film having a variable PS and a variable BW.
Figure 18B:
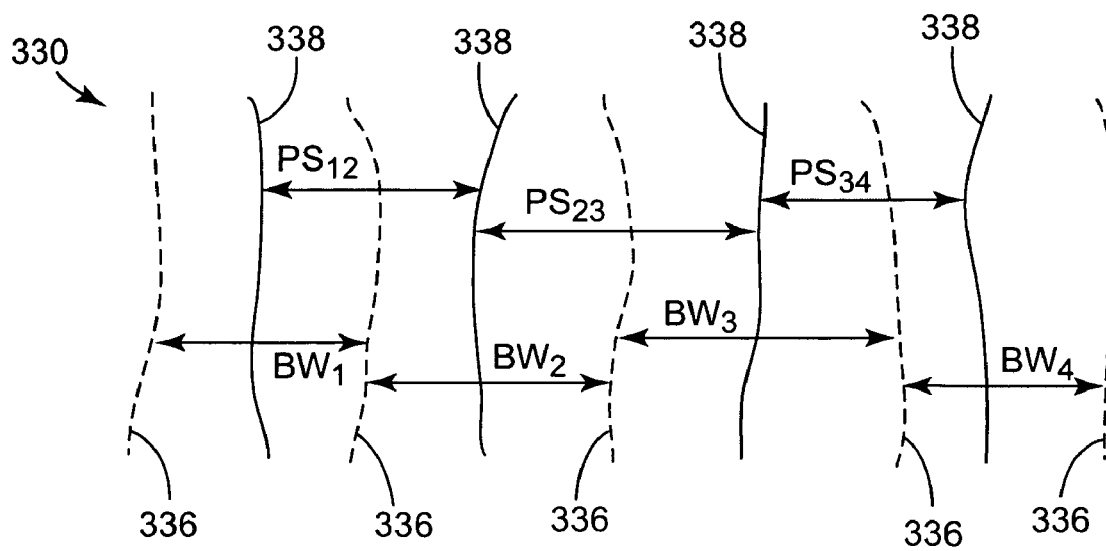
Figure 19A:
FIGS. 19A-19C are edge views of scanning electron microscope (SEM) images of an exemplary sample having 10% random pitch.
Figure 19B:
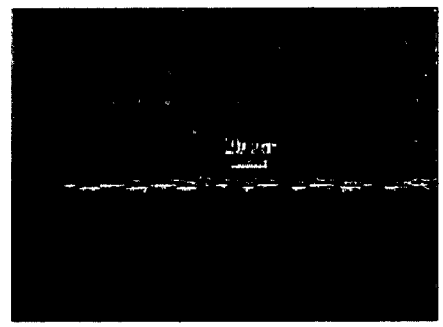
Figure 19C:
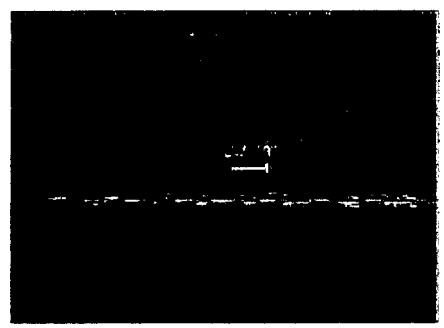
Figure 20A:
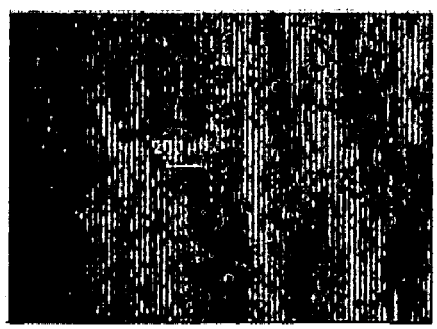
FIGS. 20A and 20B are top views of SEM images of an exemplary sample having 10% random pitch.
Figure 20B:
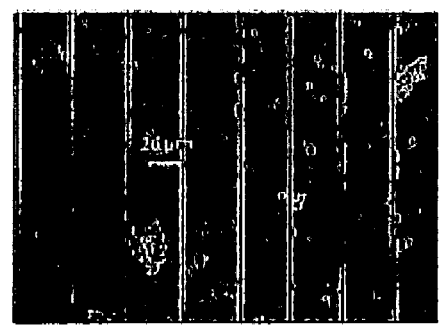
Figure 21A:
FIGS. 21A-21C are edge views of SEM images of an exemplary sample having 100% random pitch.
Figure 21B:
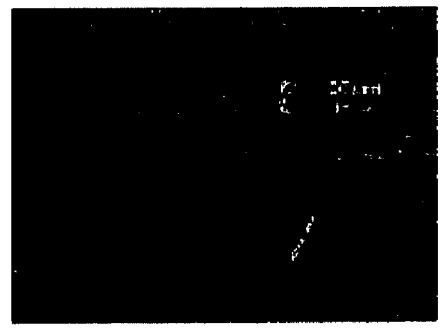
Figure 21C:
Figure 22A:
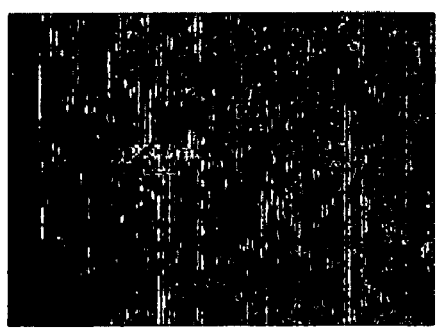
FIGS. 22A and 22B are top views of SEM images of an exemplary sample having 100% random pitch.
Figure 22B:
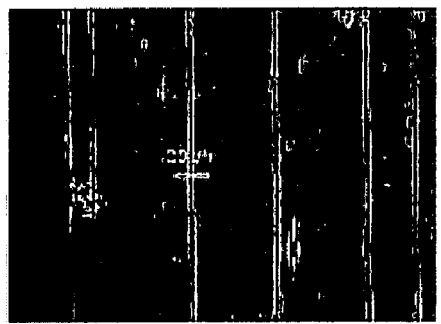

FIGS. 18A and 18B are side and top views, respectively, of a section of a variable pitch microstructured birefringent film 330 having a variable PS and a variable BW. In FIG. 18A, the side view of film 330 is shown with cross sections 332 and 334 at two locations along the groove direction. Film 330 has a variable PS, as shown by the different distances represented by $PS_{12}$, $PS_{23}$, and $PS_{34}$, and it also has a variable BW, as shown by the different distances represented by $BW_1$, $BW_2$, and $BW_3$. In FIG. 18B, the top view of film 330 illustrates the projected peak contours 338 and valley contours 336.

FIGS. 19-22 are images of samples illustrating 10% and 100% random pitch. FIGS. 19A-19C and 20A-20B are edge views and top views, respectively, of SEM images of an exemplary sample having 10% random pitch. FIGS. 21A-21C and 22A-22B are edge views and top views, respectively, of SEM images of an exemplary sample having 100% random pitch.

A variable pitch blur filter can be tested as follows. The effect of an intervening film on a transmitted light signal can be directly observed by measuring the transmitted intensities of a light source directed through the film and collected as an image on a sensor array. A simple digital sensor array is a digital camera. The resolution can be controlled by varying the distance from the film to the camera. A variety of sources may be used including lasers and white light sources. When a light source is directed through a film with structured features, a spot pattern often appears. For example, when a film with elongate structures of regular, periodic pitch is constructed to form a diffraction grating and a collimated beam of light is directed through it, a spot pattern will form as the image.

The peak of highest intensity may be assigned as the zeroth order peak in this test. Additional spots of diminishing intensity typically form at predictable positions in a line across the groove direction of the diffraction grating. This is the so-called diffraction pattern. When a white light source is used, the image can be divided into red, green and blue light contributions. In the case of a diffraction grating, the various colors form diffraction patterns with various spacings. The blue light typically has more tightly packed spots relative to the green light and even more so relative to the red light. In general, the spacing between diffraction peaks is a strong function of wavelength. When the diffraction grating is birefringent, the resulting diffraction pattern can also vary with the polarization state of the incident light relative to the orientation of the structure. Some aspects of this polarization dependence has been described in Liu et. al. Appl. Phys. lett. 67 (14), 1995, p 1972 and Liu et al. J. Opt. Soc. Am A, 14 (1) 197, p 49.

In the method of the present invention, the concept of aperiodicity and/or randomness can be applied to films with birefringent structures. Unlike isotropic diffraction gratings, films with birefringent surface features have two distinct diffraction patterns for two orthogonal states of polarization. Because the states are orthogonal, they do not mutually interfere. Introduction of aperiodicity disturbs the diffraction patterns of both polarization states. A result is that, in many cases, the combined intensity of the two states of polarization tends to concentrate and equalize around and between the anticipated positions of the two main peaks of these two orthogonal polarization states for a film with regular or nearly regular surface features. This feature is particularly advantageous for use as a blur filter (optical low-pass filter) using the spatial split between the two orthogonal polarization states to control the extent of the blurring. Such concentration and equalization can also assist in the color balancing and uniformity of a blurred image.

The improvement of the optical performance of a blur filter made with films possessing birefringent quasi-aperiodic surface features can be achieved through a variety of strategies. In one method, an aperiodic progression of pitch, i.e. the progression of basal width, can be chosen to break up the constructive and destructive interference extremes. A pattern can be chosen deliberately to avoid common factors among the spacings of the various features. In another method, the pattern can be chosen by a randomizing algorithm chosen to conform to an expected mean with a predetermined distribution of basal width. In another method, the pattern can be formed by a process that randomly changes in the depth of cutting due to a diamond turning plunging method, for example. An example of a method of diamond turning is described in U.S. Pat. No. 6,354,709, which is incorporated herein by reference as if fully set forth. In these manners, an array of quasi-aperiodic structures can be formed that have either a constant cross section for the collection of features along the groove direction (i.e., each particular feature in the collection has a uniform, constant cross-sectional size and shape as one proceeds down the groove direction), or a variable cross section for the collection of features along the groove direction (i.e., each particular feature in the collection has a changing cross-sectional size or shape as one proceeds down the groove direction).

Blur filters consistent with the present invention can include structured birefringent articles having bodies made from any of the techniques described above and in Example 1 and in the other examples referenced above. Although the blur filters are described above as using a sawtooth pattern, they can use structured birefringent articles having any type of structured surface with any type of geometric features providing for refraction of light such as, for example, those shown in FIGS. 3A-3W.

These blur filters can have the advantages associated with polymer and web processing to make the structured birefringent articles or films. In particular, embodiments consistent with the present invention can provide for blur filters that: use a thin article or film that is easy to handle and highly tunable to vary the amount of blur or other features by adjusting the parameters of the articles (for example, material, thickness, type of geometric features, and orientation); can provide a high degree of optical clarity; can be placed anywhere within the optical path between the lens and image sensor; and can be easily integrated with other film technology such as IR filters, antireflective coatings, reflective polarizers, circular polarizers, wavelength filters, and adhesive coatings. Any of these exemplary coatings and films can be applied on structured or non-structured surfaces of the articles, and they can be placed anywhere on the articles (for example, between the articles, or on a top or bottom surface of at least one of the articles).

The blur filters can be used in any device having image processing capabilities. For example, they can be used in any digital imaging devices having image sensors such as digital cameras, mobile phones having digital cameras, personal digital assistants having digital cameras, or any other devices having digital cameras. The blur filters can also be used in any analog imaging device. For example, with analog video cameras, striped shirts often produce color moiré effects, and the blur filters can help eliminate or reduce those effects in analog imaging devices.

The blur filters can include multiple articles, each having the same geometric features on a structured surface, as described with respect to FIG. 8, or multiple articles having different geometric features on structured surfaces such as one having sawtooth geometric features and the other having sinusoidal geometric features. The blur filters can optionally include, but do not require, index matching material or fluid on one or more surfaces of the articles or between the articles. They can also optionally be laminated or adhered to a sealing plate such as, for example, glass, plexiglass, or plastic. The articles for the blur filters can be made from, for example, those materials described above and in Example 1, and in the other examples referenced above, using the process shown in and described with respect to FIG. 4, including the use of diamond turned films (films formed by a diamond turned method) or otherwise structured films by machining, cutting, ablation, or other techniques. Alternative processes include extrusion, replication onto a sheet, extrusion into a nip with rollers, embossing and molding.

Aside from the exemplary parameters provided, the articles for the blur filters can include other parameters (thickness, height of geometric features, and pitch), possibly based upon particular implementations. The blur filters can be combined with any type of inorganic medium, such as a walk-off plate, or combined with a diffractive medium. The films for the blur filters can be pressed onto and adhered to a lens or embedded within a lens, such as lens 144. When pressed onto a lens, the blur filters become curved and, in that case, the nomenclature used in this specification refers to the local tangents of the curved surface. The films for the blur filters can be made by many different processes, for example constraining a film for flatness, warming the film to incipient softness, and pressing a curved surface onto it or wrapping it around a cylinder to impart a structured surface.

In the above description, the position of elements has sometimes been described in terms of "first", "second", "third", "top" and "bottom". These terms have been used merely to simplify the description of the various elements of the invention, such as those illustrated in the drawings. They should not be understood to place any limitations on the useful orientation of the elements of the present invention. Also, as an alternative to the use of axes, the positioning of a single article, or of multiple articles used together, can be described in terms of their Euler angles.

Accordingly, the present invention should not be considered limited to the particular examples described above, but rather should be understood to cover all aspects of the invention as fairly set out in the claims. Various modifications, equivalents, as well as numerous structures to which the present invention may be applicable will be readily apparent to those of skill in the art to which the present invention is directed upon review of the present specification. The claims are intended to cover such modifications and devices.

EXAMPLES

Example 1

Creation of Oriented Microstructured Film

A polyethylene terephthalate (PET) with an inherent viscosity (I.V.) of 0.74 available from Eastman Chemical Company, Kingsport, Tenn. was used in this example.

The PET pellets were dried to remove residual water and loaded into an extruder hopper under a nitrogen purge. The PET was extruded with an increasing temperature profile of 232° C. to 282° C. within the extruder and the continuing melt train through to the die set at 282° C. Melt train pressures were continuously monitored and an average taken at the final monitored position along the melt train prior to bringing the die into close proximity to the tool onto which the polymer film is formed simultaneously with the structuring of a first surface of that film against the tool.

The tool was a structured belt Nickel alloy specific composition unknown, made at 3M, electroformed, welded sections having a negative version of the structured surface formed on the cast film. The structured surface comprised a repeating and continuous series of triangular prisms. The triangles formed a sawtooth-like pattern. The basal vertices of the individual prisms were shared by their adjoining, neighboring structures. The prisms were aligned along the casting or machine direction (MD) direction. The structured surface of the tool was coated with a fluorochemical benzotriazole having the formula

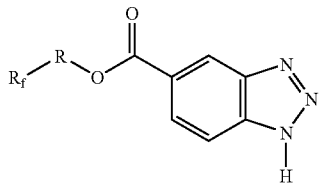

where $R_f$ is $C_8F_{17}$ and R is —$(CH_2)_2$—, as disclosed in U.S. Pat. No. 6,376,065. The tool was mounted on a temperature-controlled rotating can which provided a continuous motion of the tool surface along the casting (MD) direction. The measured surface temperature of the tool averaged 92° C.

The die orifice through which the molten polymer exited the melt train was brought into close proximity with the rotating belt tool forming a final slot between the tool and die. The pressure at the final monitored position along the melt train increased as the die and tool became closer. The difference between this final pressure and the previously recorded pressure is referred to as the slot pressure drop. The slot pressure drop in this example was $7.37 \times 10^6$ Pa (1070 psi) providing sufficient pressure to drive the molten polymer into the structured cavities formed by the tool negative. The film thereby formed and structured was conveyed by the tool rotation from the slot, quenched with additional air cooling, stripped from the tool and wound into a roll. Including the height of the structures, the total thickness of the cast film (T) was about 510 microns.

The cast and wound polymer film closely replicated the tool structure. Using a microscope to view the cross section, a prismatic structure was identified on the surface of the film with an approximately 85° apex angle, 20° inclination from the horizontal of the film land for one leg of the triangle and a 15° tilt from the perpendicular for the opposite leg. The measured profile exhibited the expected, nearly right triangular form with straight edges and a slightly rounded apex. The replicated prisms on the polymeric film surface were measured to have a basal width of 44 microns and a height (P) of 19 microns. The peak-to-peak spacing (PS) was approximately the same as the basal width. The film was imperfect and there were small variations from nominal sizing owing to tooling defects, replication process defects, and thermal shrinkage effects.

The structured cast film was cut into sheets with an aspect ratio of 10:7 (along the grooves:perpendicular to grooves), preheated to about 100° C. as measured in the plenums of the tenter, stretched to a nominal stretch ratio of 6.4 and immediately relaxed to a stretch ratio of 6.3 in a nearly truly uniaxial manner along the continuous length direction of the prisms using a batch tenter process. The relaxation from 6.4 to 6.3 was accomplished at the stretch temperature to control shrinkage in the final film. The structured surfaces maintained a prismatic shape with reasonably straight cross-sectional edges (reasonably flat facets) and approximately similar shape. The basal width after stretch was measured by microscopy cross-sectioning to be 16.5 microns and the peak height after stretch (P') was measured to be 5.0 microns. The final thickness of the film (T'), including the structured height, was measured to be 180 microns. The indices of refraction were measured on the backside of the stretched film using a Metricon Prism Coupler as available from Metricon, Piscataway, N.J., at a wavelength of 632.8 nm. The indices along the first in-plane (along the prisms), second in-plane (across the prisms) and in the thickness direction were measured to be 1.672, 1.549 and 1.547 respectively. The relative birefringence in the cross-sectional plane of this stretched material was thus 0.016.

When placed within an optical path, the film provided for a shifting (double) image that shifted markedly in response to the rotation of a polarizer held between the film and a viewer.

Although this example describes the creation of a film with periodic structures, the same methods and procedures apply to create a film with aperiodic structures. As the breadth of the probability distribution for the random pitches increases beyond a particular value, based for example upon empirical evidence, it may be necessary to modify the procedures.

Example 2

Variable Pitch Blur Filter with White Light Source

Sample Preparation

The tooling was cut by diamond turning copper sheeting on a 3M Pneumo. No oil or liquid cooling was used. The diamond used had an 84 degree included angle and was held so as to yield a cut with a 6 degree angle off of horizontal with a vertical facet sidewall. The cut tool was treated with BTA. Unoriented PET cast films were then embossed in a compression molding machine. The process conditions varied depending upon the material being molded. Conditions were chosen such that high fidelity replication was achieved while avoiding crystallization induced haze. If a sample displayed haze that was discernible to the eye that sample was discarded. Sometimes it was found to be helpful to use an ice bath to rapidly cool the film.

Samples were then cut to size and uniaxially oriented in a commercial lab scale batch tentering machine. Draw conditions varied depending upon the material, the thickness, and the target birefringence. The stretched samples were then tested for refractive index through measuring the back side properties on a Metricon. Geometric structural features on the active face were measured by profilometry. Other geometric features such as peak tip sharpness and valley sharpness were measured by cross-sectioning and examination under SEM or optical microscopy.

When laminated, the films were laminated to 3M 8132 optical pressure sensitive adhesive using a small laminator in a class 10,000 clean room. Lamination quality was then inspected by optical microscopy and regions with scratches, debris or bubbles were then avoided during subsequent tests. If Index matching fluid was used, it was a 1.64 refractive index fluid from Cargill.

Sample Test

A beam of collimated white light was projected through blur filters of two different designs. The first design had plus or minus 10% random variability in the groove pitch spacing, whereas the second design had plus or minus 100% random variability in the groove pitch spacing. The light passing through the filter was projected onto a high contrast beaded sheet screen for projection TV (3M proprietary, glass beads embedded in a black resin matrix). The image on the projection screen was then photographed using a Konica Minolta DiMAGE A2 digital CCD camera. The capture mode for the camera was RAW, thereby preserving the 12 bit pixel depth that the camera is capable of. In addition, all accessible automatic functions of the camera were overridden so as to ensure consistency from photo to photo. When viewing the resulting image, diffractive artifacts were reduced in the 10% random pitch sample and even more reduced in the 100% random pitch sample.

Camera Conditions for Example 2

| Picture 2a (10% random pitch) | Picture 2b (100% random pitch) |
|---|---|
| Camera Manufacturer: Konica Minolta Camera, Inc. | Camera Manufacturer: Konica Minolta Camera, Inc. |
| Camera Model: DiMAGE A2 | Camera Model: DiMAGE A2 |
| Software: DiMAGE A2 Ver.1.10 | Software: DiMAGE A2 Ver.1.10 |
| Date/Time: 2005:06:08 16:26:07 | Date/Time: 2005:06:08 16:28:17 |
| YCBCr Positioning: Centered | YCBCr Positioning: Centered |
| Exposure Time: 30 sec | Exposure Time: 30 sec |
| F Number: 11.0 | F Number: 11.0 |
| Exposure Program: Manual | Exposure Program: Manual |
| ISO Speed: 100 | ISO Speed: 100 |
| Exposure Bias Value: 0.0 | Exposure Bias Value: 0.0 |
| Max Aperture Value: 3.62 | Max Aperture Value: 3.62 |
| Light Source: Daylight | Light Source: Daylight |
| Focal Length: 50.204 mm | Focal Length: 50.204 mm |
| ColorSpace: 1 | ColorSpace: 1 |
| Width: 3264 pixels | Width: 3264 pixels |
| Height: 2448 pixels | Height: 2448 pixels |

Example 3

Variable Pitch Blur Filter with Laser Light Source

Sample Preparation

A sample was prepared as explained in Example 2. The film was PET with an embossed 6° sawtooth structure with pitch variation.

Sample Test

The test set-up was the same as in Example 2, except that a green laser was used as the light source instead of the white light source. When viewing the resulting image, diffractive artifacts were reduced in the 10% random pitch sample and even more reduced in the 100% random pitch sample.

Camera Conditions for Example 3

| Picture 3a (10% random pitch) | Picture 3b (100% random pitch) |
|---|---|
| Camera Manufacturer: Konica Minolta Camera, Inc. | Camera Manufacturer: Konica Minolta Camera, Inc. |
| Camera Model: DiMAGE A2 | Camera Model: DiMAGE A2 |
| Software: DiMAGE A2 Ver.1.10 | Software: DiMAGE A2 Ver.1.10 |
| Date/Time: 2005:06:08 15:56:05 | Date/Time: 2005:06:08 16:00:22 |
| YCBCr Positioning: Centered | YCBCr Positioning: Centered |
| Exposure Time: 1/200 sec | Exposure Time: 1/200 sec |
| F Number: 11.0 | F Number: 11.0 |
| Exposure Program: Manual | Exposure Program: Manual |
| ISO Speed: 100 | ISO Speed: 100 |
| Exposure Bias Value: 0.0 | Exposure Bias Value: 0.0 |
| Max Aperture Value: 3.36 | Max Aperture Value: 3.36 |
| Light Source: Daylight | Light Source: Daylight |
| Focal Length: 16.8 mm | Focal Length: 16.8 mm |
| ColorSpace: 1 | ColorSpace: 1 |
| Width: 3264 pixels | Width: 3264 pixels |
| Height: 2448 pixels | Height: 2448 pixels |

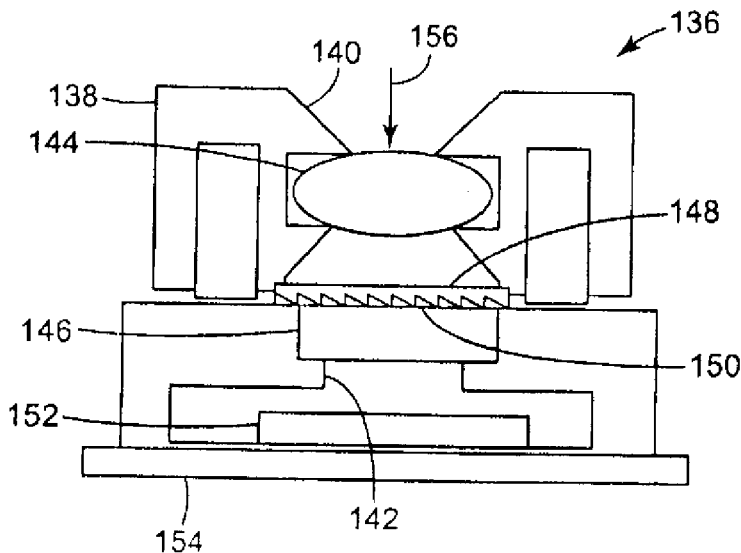

What is claimed:

1. A blur filter, comprising:
   (a) a body having (i) first and second surfaces, and (ii) first and second in-plane axes that are orthogonal with respect to each other and a third axis that is mutually orthogonal to the first and second in-plane axes in a thickness direction of the body; and
   (b) a portion of the first surface being a structured surface having a variable pitch and a linear geometric feature,
   wherein the portion is structured such that, when the blur filter is placed within an optical path between a lens and an image sensor, the structured surface spreads a light signal in the optical path into a plurality of light signals being at least partially spatially separated when incident upon the image sensor, and
   wherein the body has birefringence and the birefringence is imparted by stretching the body after forming the linear geometric feature on the body, and wherein a cross sectional shape of the linear geometric feature after the stretching is substantially identical to a cross sectional shape of the linear geometric feature prior to the stretching.

2. The blur filter of claim 1, wherein the variable pitch comprises a random pitch, an aperiodic pitch, or a quasi-aperiodic pitch.

3. The blur filter of claim 1, wherein the portion is structured such that, when placed within the optical path and used with the image sensor having pixels each having a plurality of sub-pixels, the plurality of light signals are incident upon different sub-pixels.

4. The blur filter of claim 1, wherein the blur filter causes spreading of a light signal when placed within the optical path with the third axis being substantially parallel to the optical path.

5. The blur filter of claim 1, wherein the blur filter causes spreading of a light signal when placed within the optical path with the third axis being at a non-zero angle to the optical path.

6. The blur filter of claim 1, further including a film positioned adjacent the body, wherein the film comprises at least one of the following: a retarder, a wave plate, a multilayer optical film, an IR filter, or a circular polarizer.

7. The blur filter of claim 6, further including an antireflective coating on a surface of the body.

8. A blur filter, comprising:
(a) a body having (i) first and second surfaces, and (ii) first and second in-plane axes that are orthogonal with respect to each other and a third axis that is mutually orthogonal to the first and second in-plane axes in a thickness direction of the body; and
(b) a portion of the first surface having geometric features with variable angles, wherein when the blur filter is placed within an optical path between a lens and an image sensor, the surface spreads a light signal in the optical path into a plurality of light signals being at least partially spatially separated when incident upon the image sensor, and wherein the body has birefringence and the birefringence is imparted by stretching the body after forming the geometric features on the body, and wherein a cross sectional shape of the geometric features after the stretching are substantially identical to a cross sectional shape of the geometric features prior to the stretching.

9. The blur filter of claim 8, wherein the portion is structured such that, when placed within the optical path and used with the image sensor having pixels each having a plurality of sub-pixels, the plurality of light signals are incident upon different sub-pixels.

10. The blur filter of claim 8, wherein the blur filter causes spreading of a light signal when placed within the optical path with the third axis being substantially parallel to the optical path.

11. The blur filter of claim 8, wherein the blur filter causes spreading of a light signal when placed within the optical path with the third axis being at a non-zero angle to the optical path.

12. The blur filter of claim 8, further including a film positioned adjacent the body, wherein the film comprises at least one of the following: a retarder, a wave plate, a multi-layer optical film, an IR filter, or a circular polarizer.

13. The blur filter of claim 12, further including an antireflective coating on a surface of the body.

14. A method of making a blur filter, comprising the steps of:
(a) providing a body having (i) first and second surfaces, and (ii) first and second in-plane axes that are orthogonal with respect to each other and a third axis that is mutually orthogonal to the first and second in-plane axes in a thickness direction of the body; and
(b) forming a structured surface having a variable pitch and a linear geometric feature on a portion of the first surface, wherein the portion is structured such that, when the blur filter is placed within an optical path between a lens and an image sensor, the structured surface spreads a light signal in the optical path into a plurality of light signals being at least partially spatially separated when incident upon the image sensor, and wherein the body has birefringence and the birefringence is imparted by stretching the body after forming the linear geometric features on the body, and wherein a cross sectional shape of the linear geometric features after the stretching is substantially identical to a cross sectional shape of the linear geometric features prior to the stretching.

15. The method of claim 14, wherein the forming step includes forming the variable pitch as a random pitch, an aperiodic pitch, or a quasi-aperiodic pitch.

16. The method of claim 14, wherein the forming step includes structuring the portion such that, when placed within the optical path and used with the image sensor having pixels each having a plurality of sub-pixels, the plurality of light signals are incident upon different sub-pixels.

17. The method of claim 14, further comprising the step of forming the structured surface such that the blur filter causes spreading of a light signal when placed within the optical path with the third axis being substantially parallel to the optical path.

18. The method of claim 14, further comprising the step of forming the structured surface such that the blur filter causes spreading of a light signal when placed within the optical path with the third axis being at a non-zero angle to the optical path.

19. An optical package having a blur filter, comprising:
a housing having a first end with an aperture, a second end with an aperture, and an interior portion that defines an optical path;
a lens within the first end wherein, when the package is placed over an image sensor with the aperture in the second end positioned adjacent the image sensor, the lens focuses incoming light onto the image sensor; and
a blur filter positioned in the optical path of the interior portion between the first and second ends of the housing, the blur filter comprising:
(a) a body having (i) first and second surfaces, and (ii) first and second in-plane axes that are orthogonal with respect to each other and a third axis that is mutually orthogonal to the first and second in-plane axes in a thickness direction of the body; and
(b) a portion of the first surface being a structured surface having a linear geometric feature and having a variable pitch comprising a random pitch, an aperiodic pitch, or a quasi-aperiodic pitch, wherein the portion is structured such that, when the package is placed over the image sensor for the lens to focus the incoming light onto the image sensor, the structured surface spreads a light signal in the optical path into a plurality of light signals being at least partially spatially separated when incident upon the image sensor, and wherein the body has birefringence and the birefringence is imparted by stretching the body after forming the linear geometric features on the body, and wherein a cross sectional shape of the linear geometric features after the stretching is substantially identical to a cross sectional shape of the linear geometric features prior to the stretching.

* * * * *

UNITED STATES PATENT AND TRADEMARK OFFICE
CERTIFICATE OF CORRECTION

PATENT NO. : 7,418,202 B2
APPLICATION NO. : 11/196887
DATED : August 26, 2008
INVENTOR(S) : Rolf W. Biernath It is certified that error appears in the above-identified patent and that said Letters Patent is hereby corrected as shown below:

The title page showing the illustrative figure should be deleted to be replaced with the attached title page.

The drawing sheet, consisting of Figs. 9, 10, 11A, 11B, 11C, 11D, 12, should be deleted to be replaced with the drawing sheet, consisting of Fig. 9, 10, 11A, 11B, 11C, 11D, 12, as shown on the attached pages.

Title page; item (56); Page 2,
Column 2, Line 21, delete "06 175073" and insert -- 06-175073 --, therefor.

Column 10,
Line 18, Delete "2 propanol" and insert -- 2-propanol --, therefor.

Column 11,
Line 36, delete "polyethylene bibenzoate," and insert -- polyethylene dibenzoate, --, therefor.
Line 37, delete "polthylene naphthalate" and insert -- polyethylene naphthalate --, therefor.
Line 40, delete "thereof)," and insert -- thereof, --, therefor.

Column 12,
Line 52, delete "pheneanthrene," and insert -- phenanthrene, --, therefor.
Line 67, delete "di methyl" and insert -- dimethyl --, therefor.

Column 13,
Line 35, delete "thereof," and insert -- thereof; --, therefor.

Column 21,
Line 21, delete "213," and insert -- 213. --, therefor.

Column 23,
Line 31, delete "a this" and insert -- a --, therefor.

Column 24,
Line 54, delete "Liu et. al." and insert -- Liu et al. --, therefor.

Column 27,
Line 21, after "formula" insert -- : --.

UNITED STATES PATENT AND TRADEMARK OFFICE
CERTIFICATE OF CORRECTION

PATENT NO. : 7,418,202 B2
APPLICATION NO. : 11/196887
DATED : August 26, 2008
INVENTOR(S) : Rolf W. Biernath It is certified that error appears in the above-identified patent and that said Letters Patent is hereby corrected as shown below:

Column 32,
Line 1, delete "features" and insert -- feature --, therefor.
Line 2, delete "features" and insert -- feature --, therefor.
Line 4, delete "features" and insert -- feature --, therefor.
Line 51, delete "features" and insert -- feature --, therefor.
Line 52, delete "features" and insert -- feature --, therefor.
Line 54, delete "features" and insert -- feature --, therefor.

Signed and Sealed this

Seventeenth Day of November, 2009

David J. Kappos
*Director of the United States Patent and Trademark Office*

United States Patent
Biernath et al.

(10) Patent No.: US 7,418,202 B2
(45) Date of Patent: Aug. 26, 2008

(54) ARTICLE HAVING A BIREFRINGENT SURFACE AND MICROSTRUCTURED FEATURES HAVING A VARIABLE PITCH OR ANGLES FOR USE AS A BLUR FILTER

(75) Inventors: Rolf W. Biernath, Wyoming, MN (US); Robert L. Brott, Woodbury, MN (US); William Ward Merrill, White Bear Lake, MN (US); John S. Huizinga, Dellwood, MN (US); William B. Black, Eagan, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 479 days.

(21) Appl. No.: 11/196,887

(22) Filed: Aug. 4, 2005

(65) Prior Publication Data
US 2007/0031140 A1  Feb. 8, 2007

(51) Int. Cl.
G03B 7/099 (2006.01)
G03B 17/18 (2006.01)
H04N 9/083 (2006.01)
H04N 5/335 (2006.01)
G02B 27/28 (2006.01)

(52) U.S. Cl. ............... 396/268; 348/290; 348/335; 359/495; 359/497; 359/575; 359/576

(58) Field of Classification Search ........... 396/268, 396/101, 209, 241, 275, 307; 348/335, 256, 348/224.1, 270, 273, 290, 342, 360; 359/486, 359/501, 575, 576, 494–497, 569
See application file for complete search history.

(56) References Cited

U.S. PATENT DOCUMENTS 2,618,012 A  11/1952  Milne (Continued)

FOREIGN PATENT DOCUMENTS

CA  2191072  10/1996

(Continued)

OTHER PUBLICATIONS

Davis, Jeffrey A. et al., *Polarization Beam splitters using Polarization Diffraction Gratings*, Optics Letters, vol. 26, No. 9, pp. 587-589, May 1, 2001.

(Continued)

*Primary Examiner*—Melissa Jan Koval
(74) *Attorney, Agent, or Firm*—Lance Vietzke

(57) ABSTRACT

An optical low pass filter or blur filter, and method of making the filters, using an article having a birefringent surface for refracting incoming light when used with an image sensor. The birefringent surface of the article, such as a film, is structured or tilted such that, when the blur filter is placed within an optical path between a lens and the image sensor, the birefringent surface causes refraction of a light signal in the optical path into multiple light signals each being incident upon different sub-pixels within the pixels in the image sensor to prevent or reduce artifacts, such as undesirable color moiré effects, in the resulting digital image. The structures on the surface have a variable pitch or angles. The variable pitch can include a periodic, aperiodic, or quasi-aperiodic pitch, to reduce diffractive artifacts in the resulting image.

19 Claims, 16 Drawing Sheets